(12) United States Patent
Shirahashi et al.

(10) Patent No.: US 10,865,731 B2
(45) Date of Patent: Dec. 15, 2020

(54) FUEL INJECTION CONTROL SYSTEM AND FUEL INJECTION CONTROL METHOD FOR DIESEL ENGINE

(71) Applicant: Mazda Motor Corporation, Hirosima (JP)

(72) Inventors: Naotoshi Shirahashi, Hiroshima (JP); Tunehiro Mori, Aki-gun (JP); Kiyoaki Iwata, Hiroshima (JP); Takeshi Matsubara, Hiroshima (JP); Sangkyu Kim, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 36 days.

(21) Appl. No.: 16/443,738

(22) Filed: Jun. 17, 2019

(65) Prior Publication Data

US 2020/0003147 A1 Jan. 2, 2020

(30) Foreign Application Priority Data

Jun. 28, 2018 (JP) ................................. 2018-122990

(51) Int. Cl.
*F02D 41/40* (2006.01)
*F02B 23/06* (2006.01)
*F02F 3/26* (2006.01)

(52) U.S. Cl.
CPC ........ *F02D 41/403* (2013.01); *F02B 23/0693* (2013.01); *F02D 41/401* (2013.01); *F02F 3/26* (2013.01)

(58) Field of Classification Search
CPC .............. F02B 23/0645; F02B 23/0648; F02B 23/0651; F02B 23/0693; F02D 41/402; F02D 41/403; F02D 41/405
See application file for complete search history.

(56) References Cited

U.S. PATENT DOCUMENTS 7,013,861 B1 * 3/2006 Hutmacher ........... F02D 41/403
123/276
8,156,927 B2 4/2012 Iikubo et al.
(Continued)

FOREIGN PATENT DOCUMENTS

DE 102005055367 A1 6/2006
EP 2163755 A2 3/2010
(Continued)

OTHER PUBLICATIONS

European Patent Office, Extended European Search Report Issued in Application No. 19180157.0, dated Oct. 30, 2019, Germany, 11 pages.
(Continued)

*Primary Examiner* — Sizo B Vilakazi
*Assistant Examiner* — Anthony L Bacon
(74) *Attorney, Agent, or Firm* — Alleman Hall Creasman & Tuttle LLP

(57) ABSTRACT

A fuel injection control device causes an injector to execute main injection or pilot injection toward a joint portion, and low penetration injection to inject fuel at timing earlier than the pilot injection in a PILOT region or at timing later than the main injection in an AFTER region. The fuel injection control device causes the low penetration injection to be executed to inject the fuel only in a radial central region of a combustion chamber.

9 Claims, 13 Drawing Sheets

(56) References Cited

U.S. PATENT DOCUMENTS

| | | | |
|---|---|---|---|
| 9,032,930 B2* | 5/2015 | Kuzuyama | F02D 41/401 |
| | | | 123/295 |
| 10,066,545 B2 | 9/2018 | Klyza et al. | |
| 2003/0217732 A1* | 11/2003 | Kataoka | F02B 1/12 |
| | | | 123/276 |
| 2008/0135014 A1* | 6/2008 | Blessing | F02M 63/0225 |
| | | | 123/299 |
| 2009/0025675 A1 | 1/2009 | Ilkubo et al. | |
| 2009/0095251 A1* | 4/2009 | Zoller | F02B 23/0651 |
| | | | 123/299 |
| 2010/0065017 A1 | 3/2010 | Cho et al. | |
| 2011/0005491 A1* | 1/2011 | Terada | F02D 41/403 |
| | | | 123/299 |
| 2012/0000197 A1 | 1/2012 | Maruyama et al. | |
| 2012/0016571 A1* | 1/2012 | Nada | F02D 41/402 |
| | | | 701/104 |
| 2012/0143479 A1* | 6/2012 | Nada | F02D 41/3035 |
| | | | 701/104 |
| 2015/0192087 A1 | 7/2015 | Shirahashi et al. | |
| 2015/0354519 A1 | 12/2015 | Shimo et al. | |
| 2016/0123265 A1* | 5/2016 | Ikemoto | F02D 41/405 |
| | | | 123/299 |
| 2016/0290273 A1* | 10/2016 | Ochi | F02D 41/3023 |
| 2017/0159549 A1 | 6/2017 | Uehara et al. | |
| 2017/0356383 A1* | 12/2017 | Ito | F02B 1/12 |
| 2017/0356384 A1* | 12/2017 | Ito | F02D 41/402 |
| 2018/0283315 A1* | 10/2018 | John | F02F 3/28 |
| 2019/0186402 A1* | 6/2019 | Sueoka | F02D 41/402 |
| 2020/0003146 A1* | 1/2020 | Shirahashi | F02B 23/0672 |
| 2020/0003147 A1 | 1/2020 | Shirahashi et al. | |

FOREIGN PATENT DOCUMENTS

| | | |
|---|---|---|
| FR | 2902462 A1 | 12/2007 |
| JP | 2004190573 A | 7/2004 |
| JP | 3984908 B2 | 10/2007 |
| JP | 4906055 B2 | 3/2012 |

OTHER PUBLICATIONS

European Patent Office, Extended European Search Report Issued in Application No. 19180146.3, dated Oct. 30, 2019, Germany, 9 pages.

* cited by examiner

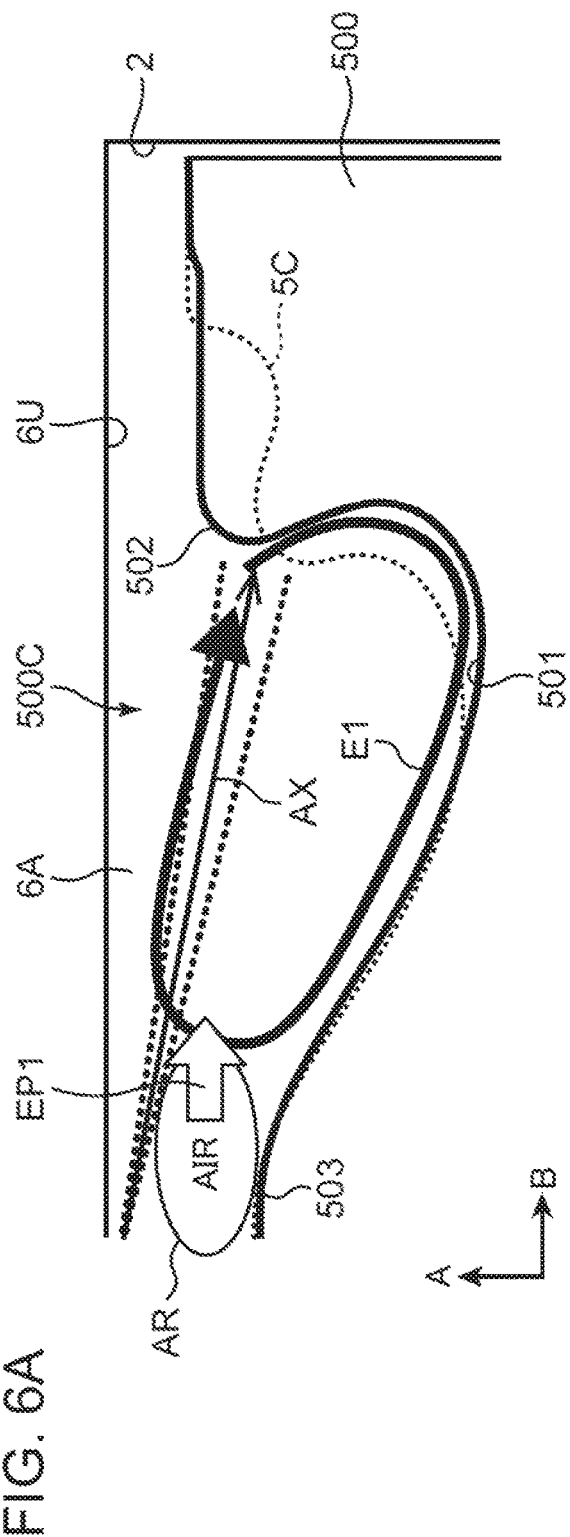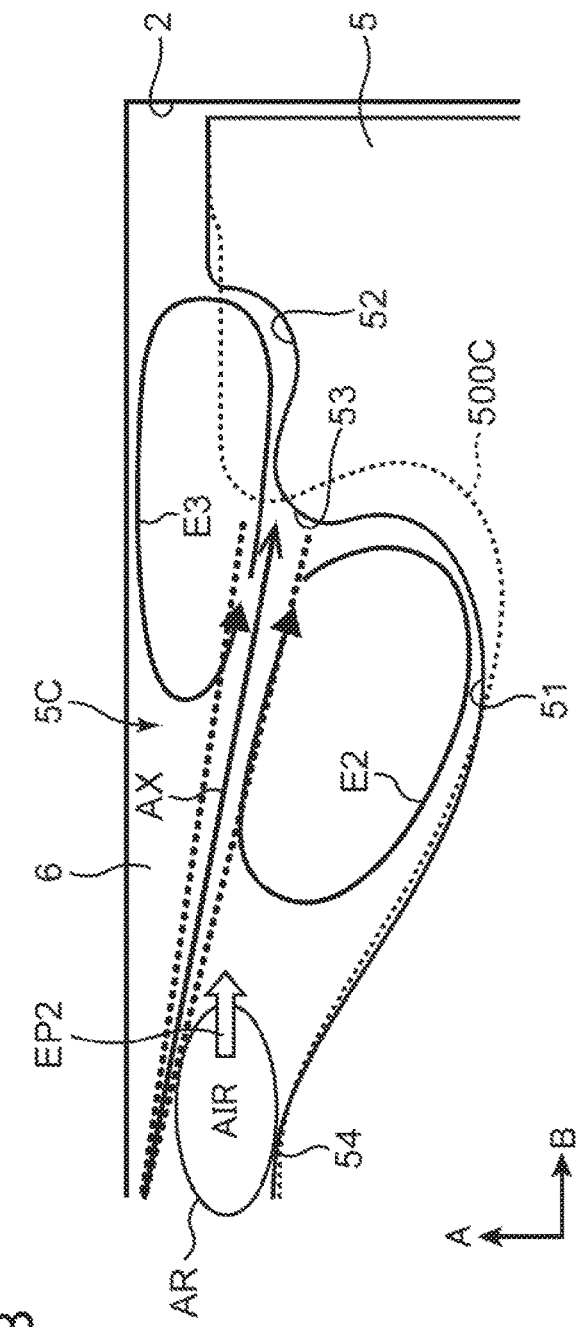

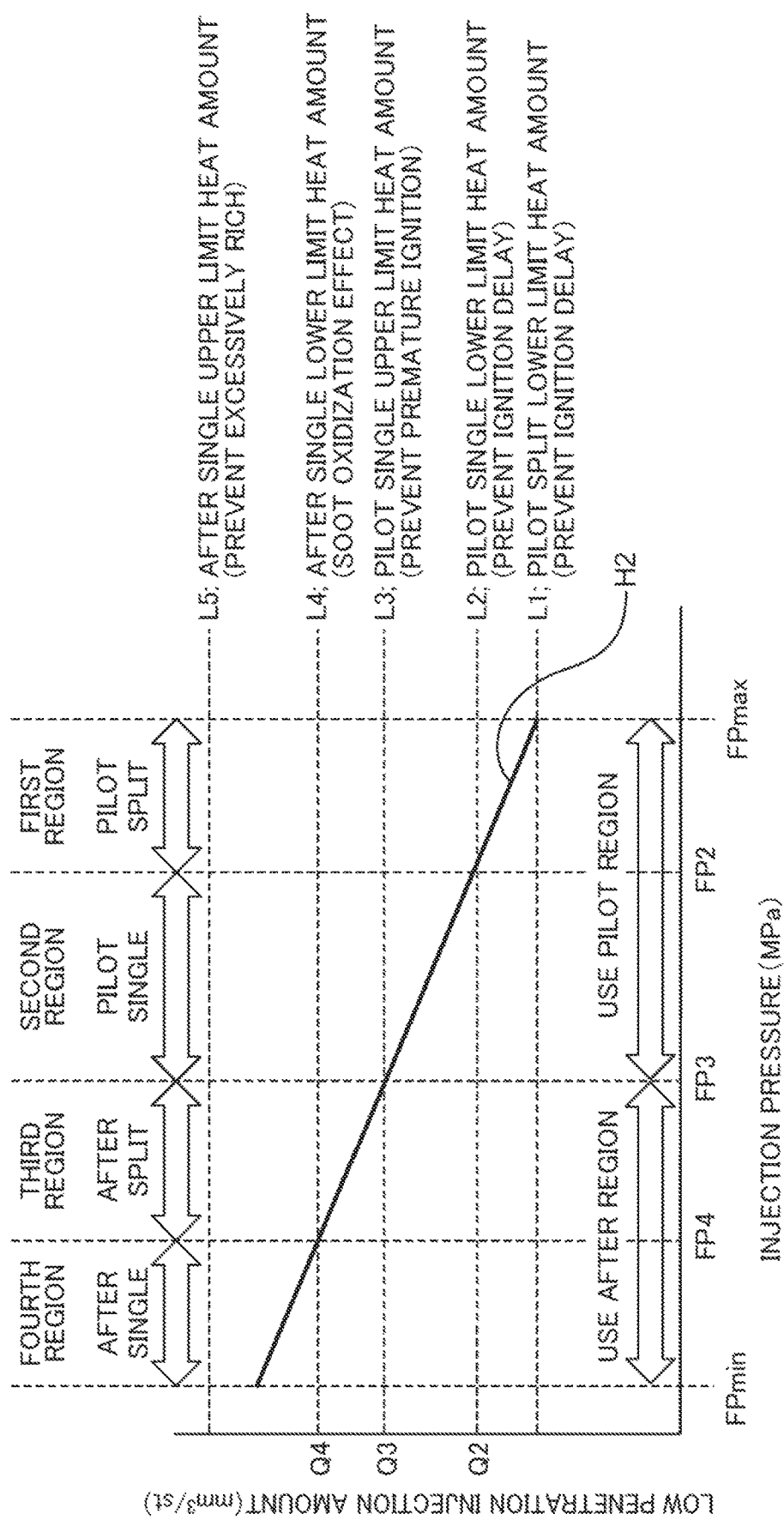

FUEL INJECTION CONTROL SYSTEM AND FUEL INJECTION CONTROL METHOD FOR DIESEL ENGINE

TECHNICAL FIELD

The present invention relates to a fuel injection control system and a fuel injection control method for a diesel engine in which a part of a combustion chamber is defined by a crown surface of a piston having a cavity.

BACKGROUND

A combustion chamber of a diesel engine for a vehicle such as an automobile is defined by an inner wall surface of a cylinder, a lower surface of a cylinder head (combustion chamber ceiling surface), and a crown surface of a piston. The combustion chamber is supplied with fuel from a fuel injection valve disposed near the radial center of the combustion chamber. A combustion chamber structure configured such that a cavity (recessed portion) is disposed on the crown surface of the piston and fuel is injected from the fuel injection valve toward the cavity is known. French Patent Application Publication No. 2902462 and Japanese Patent No. 4906055 disclose a fuel injection control system that has a combustion chamber structure in which the cavity has a two-step structure of an upper cavity and a lower cavity, and injects fuel to a branch portion of the two-step structure cavity and disperses the fuel to the upper cavity and the lower cavity.

If the two-step structure cavity is employed, an in-cylinder flow of an air-fuel mixture containing the fuel injected from the fuel injection valve is separated at the branch portion into a flow toward the upper cavity and a flow toward the lower cavity, forming a rotational flow in each cavity. Since a one-step structure cavity does not cause the separation, a relatively strong rotational flow is formed along the cavity. In contrast, the rotational flow of the two-step structure cavity is relatively weak due to the separation. Therefore, a tendency is demonstrated that air present in a radial central region of the combustion chamber is less likely to be drawn into a radial outer side of the combustion chamber because of the rotational flow. In this case, a problem occurs that an air usage rate decreases, that is, oxygen remaining in the radial central region of the combustion chamber cannot be used effectively.

SUMMARY

An object of the present invention is to provide a fuel injection control system for a diesel engine including a cavity on a crown surface of a piston, and a fuel injection control method which are able to effectively use air in a combustion chamber to form a homogeneous, thin air-fuel mixture and to inhibit generation of soot and the like as much as possible.

A fuel injection control system for a diesel engine according to one aspect of the present invention includes: a combustion chamber of an engine, formed with a lower surface of a cylinder head, a cylinder, and a crown surface of a piston; a fuel injection valve configured to inject fuel into the combustion chamber; and a fuel injection control device including a processor and configured to control an operation of the fuel injection valve. The crown surface of the piston includes a cavity. The cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion. The fuel injection valve is configured to inject the fuel toward the cavity and is disposed at or near a radial center of the combustion chamber.

The fuel injection control device is configured to cause the fuel injection valve to execute at least: a main injection to inject the fuel at timing when the piston is positioned near a compression top dead center; a pilot injection to inject the fuel at timing earlier than the main injection; and a low penetration injection to inject the fuel at timing earlier than the pilot injection or timing later than the main injection. The fuel injection control device is configured to execute: a first injection control module to execute at least one of the main injection or the pilot injection at timing of injecting the fuel toward the joint portion; and a second injection control module to execute the low penetration injection to inject the fuel only into the radial central region of the combustion chamber.

The second injection control module executes the low penetration injection at timing later than the main injection when a total amount of the fuel injected by the low penetration injection per one combustion cycle is equal to or greater than a predetermined reference amount. The second injection control module executes the low penetration injection at timing earlier than the pilot injection when the total amount of the fuel injected by the low penetration injection per one combustion cycle is less than the reference amount.

In a fuel injection control system for a diesel engine according to another aspect of the present invention, the fuel injection control device is configured to cause the fuel injection valve to execute at least: a first injection to inject the fuel at timing when the piston is positioned near a compression top dead center; a second injection to inject the fuel at timing earlier than the first injection; and a third injection to inject the fuel at timing earlier than the second injection or timing later than the first injection. The fuel injection control device is configured to execute: a first injection control module to execute at least one of the first injection or the second injection at timing of injecting the fuel toward the joint portion; and a second injection control module that executes the third injection.

The second injection control module: estimates a rotational diameter of a rotational flow generated in the first cavity portion based on injection pressure, injection amount, and injection timing of the first injection or the second injection by the first injection control module; the rotational flow being an in-cylinder flow of an air-fuel mixture containing the injected fuel; estimates an oxygen residual feasible region generated in the radial central region of the combustion chamber based on the estimated rotational diameter; executes the third injection to spray the fuel only into the estimated oxygen residual feasible region; executes the third injection at timing later than the first injection when a total amount of the fuel injected by the third injection per one combustion cycle is equal to or greater than a predetermined reference amount; and executes the third injection at timing earlier than the second injection when the total amount of the fuel injected by the third injection per one combustion cycle is less than the reference amount.

A fuel injection control method for a diesel engine according to still another aspect of the present invention includes: a first injection step in which the fuel injection valve injects the fuel at timing when the piston is positioned near a compression top dead center; a second injection step in which the fuel injection valve injects the fuel at timing earlier than the first injection; and a third injection step in which the fuel injection valve injects the fuel at timing earlier than the second injection or timing later than the first injection.

The third injection step includes: a step of estimating a rotational diameter of a rotational flow generated in the first cavity portion based on injection pressure, injection amount, and injection timing of the first injection or the second injection; the rotational flow being an in-cylinder flow of an air-fuel mixture containing the injected fuel; a step of estimating an oxygen residual feasible region generated in a radial central region of the combustion chamber based on the estimated rotational diameter; and a step in which the fuel injection valve sprays the fuel only into the estimated oxygen residual feasible region.

Furthermore, the third injection step includes: executing the third injection at timing later than the first injection when a total amount of the fuel injected by the third injection per one combustion cycle is equal to or greater than a predetermined reference amount; and executing the third injection at timing earlier than the second injection when the total amount of the fuel injected by the third injection per one combustion cycle is less than the reference amount.

BRIEF DESCRIPTION OF DRAWINGS

FIG. 6A is a diagram schematically showing an in-cylinder rotational flow when a cavity according to a comparative example is employed, and FIG. 6B is a schematic diagram showing the in-cylinder rotational flow when a cavity according to the present embodiment is employed;

FIG. 11 is a diagram showing control divisions in low penetration injection control according to the first embodiment;

DETAILED DESCRIPTION

[Overall Configuration of Engine]

Figure 1:
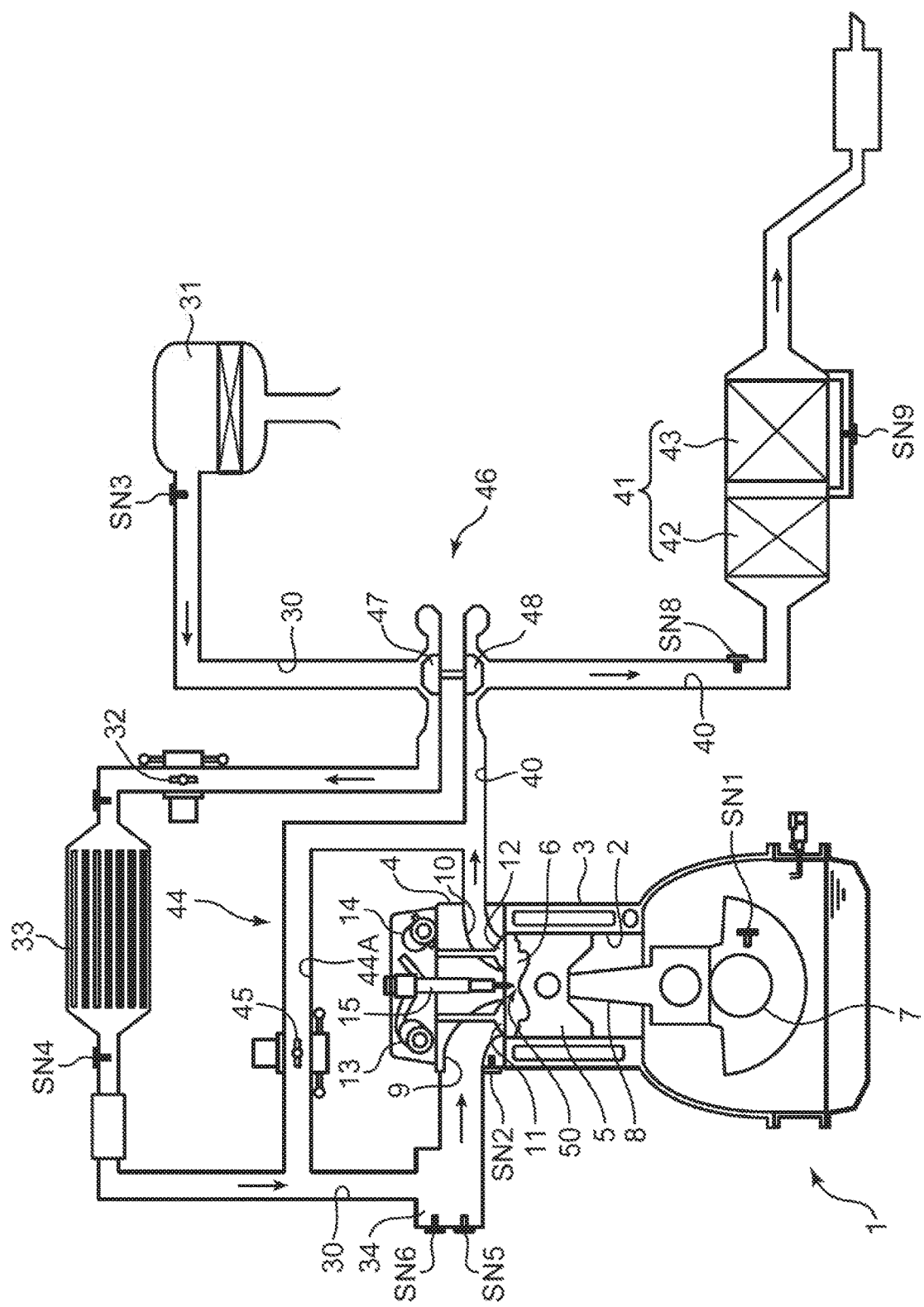
FIG. 1 is a system diagram of a diesel engine to which a fuel injection control system according to the present invention is applied.

Embodiments of a fuel injection control system for a diesel engine according to the present invention will be described in detail below with reference to the drawings. First, an overall configuration of a diesel engine system to which the fuel injection control system according to the present invention is applied will be described with reference to FIG. 1. The diesel engine shown in FIG. 1 is a four-cycle diesel engine to be mounted on a vehicle as a driving power source. The diesel engine system includes an engine body 1 that includes a plurality of cylinders 2 and is driven by supplying a fuel mainly made of light oil, an intake path 30 through which intake air to be introduced into the engine body 1 circulates, an exhaust path 40 through which an exhaust gas discharged from the engine body 1 circulates, an exhaust gas recirculation (EGR) device 44 that recirculates part of the exhaust gas circulating through the exhaust path 40 to the intake path 30, and a turbocharger 46 driven by the exhaust gas passing through the exhaust path 40.

The engine body 1 is an engine that includes a plurality of cylinders 2 arranged in a direction perpendicular to the drawing of FIG. 1 (only one of the cylinders 2 is shown in FIG. 1), and is driven by receiving the fuel supply mainly made of light oil. The engine body 1 includes a cylinder block 3, a cylinder head 4, and pistons 5. The cylinder block 3 has cylinder liners that form the cylinders 2. The cylinder head 4 is attached to an upper surface of the cylinder block 3 and covers upper openings of the cylinders 2. The pistons 5 are housed in the cylinders 2 in a reciprocatingly slidable manner and are coupled to a crankshaft 7 via connecting rods 8. In response to reciprocating motion of the pistons 5, the crankshaft 7 rotates about its central axis. The structure of the pistons 5 will be described in detail later.

Combustion chambers 6 are formed above the pistons 5. Each of the combustion chambers 6 is formed with a lower surface of the cylinder head 4 (combustion chamber ceiling surface 6U, see FIGS. 3 and 4), each of the cylinders 2, and a crown surface 50 of each of the pistons 5. The combustion chamber 6 is supplied with the fuel by injection from an injector 15 to be described later. Then, an air-fuel mixture of the supplied fuel and air is burned in the combustion chamber 6, and the piston 5 pushed down by expansion force of the combustion reciprocates in a vertical direction.

A crank angle sensor SN1 and a water temperature sensor SN2 are attached to the cylinder block 3. The crank angle sensor SN1 detects a rotation angle (crank angle) of the crankshaft 7 and a rotation speed (engine rotation speed) of the crankshaft 7. The water temperature sensor SN2 detects a temperature of cooling water (engine water temperature) circulating inside the engine body 1, that is, the cylinder block 3 and the cylinder head 4 for cooling these parts.

An intake port 9 and an exhaust port 10 communicating with the combustion chamber 6 are formed in the cylinder head 4. An intake side opening, which is a downstream end of the intake port 9, and an exhaust side opening, which is an upstream end of the exhaust port 10, are formed on a lower surface of the cylinder head 4. An intake valve 11 for opening and closing the intake side opening and an exhaust valve 12 for opening and closing the exhaust side opening are assembled in the cylinder head 4. Note that although not shown, a valve type of the engine body 1 is a four-valve type including two intake valves and two exhaust valves. Two intake ports 9 and two exhaust ports 10 are provided for each cylinder 2, and two intake valves 11 and two exhaust valves 12 are also provided.

An intake valve operating mechanism 13 and an exhaust valve operating mechanism 14 including camshafts are disposed in the cylinder head 4. The intake valve 11 and the exhaust valve 12 are driven to open and close by the valve operating mechanisms 13 and 14 in conjunction with rotation of the crankshaft 7. An intake variable valve timing system (VVT) capable of changing at least opening timing of the intake valve 11 is incorporated in the intake valve operating mechanism 13. An exhaust VVT capable of changing at least closing timing of the exhaust valve 12 is incorporated in the exhaust valve operating mechanism 14.

Figure 2A:
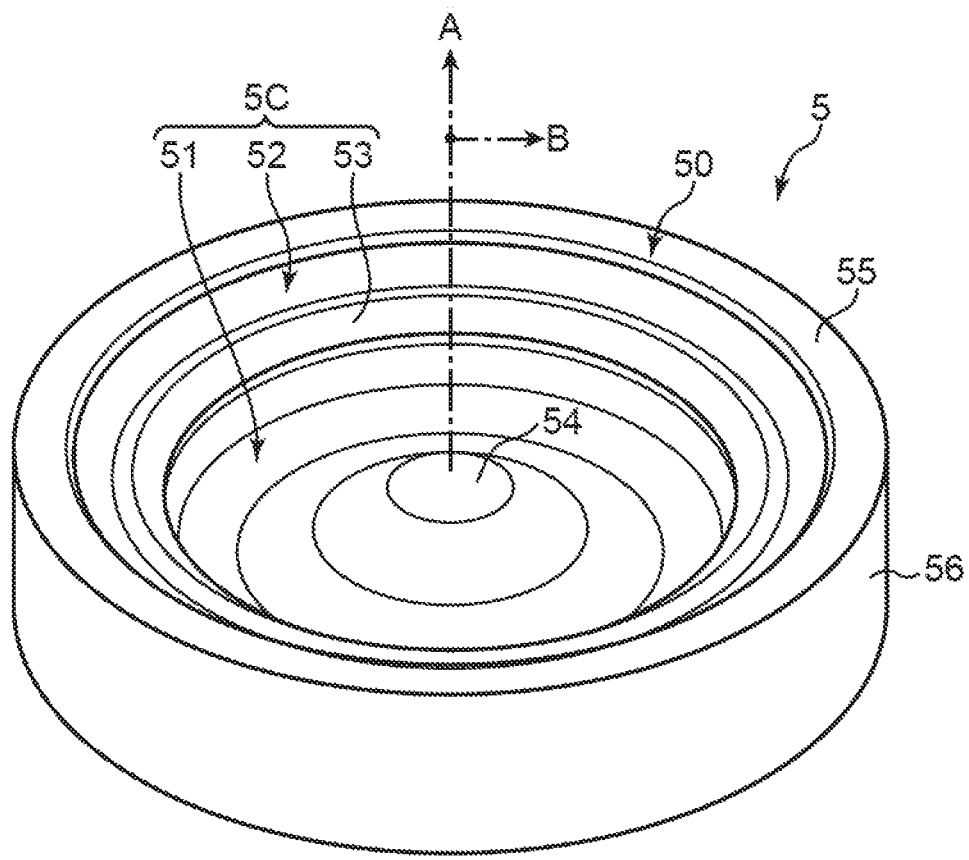
FIG. 2A is a perspective view of a crown surface portion of a piston of the diesel engine shown in FIG. 1.
Figure 2B:
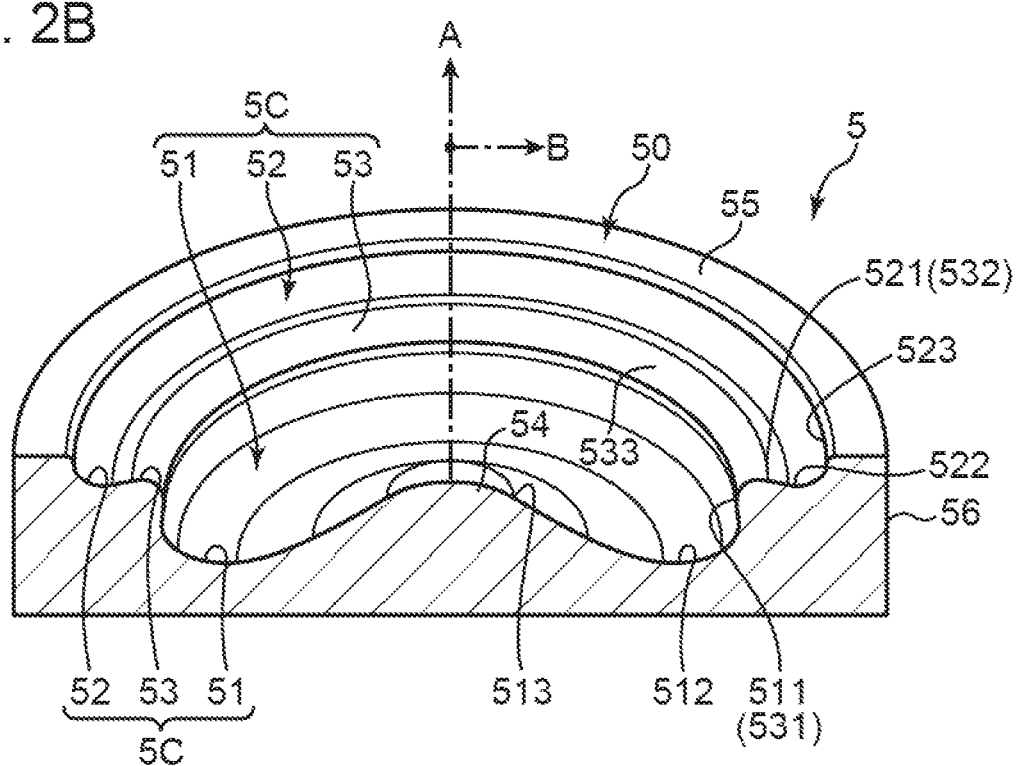
FIG. 2B is a perspective view of the piston with a cross section.
Figure 3:
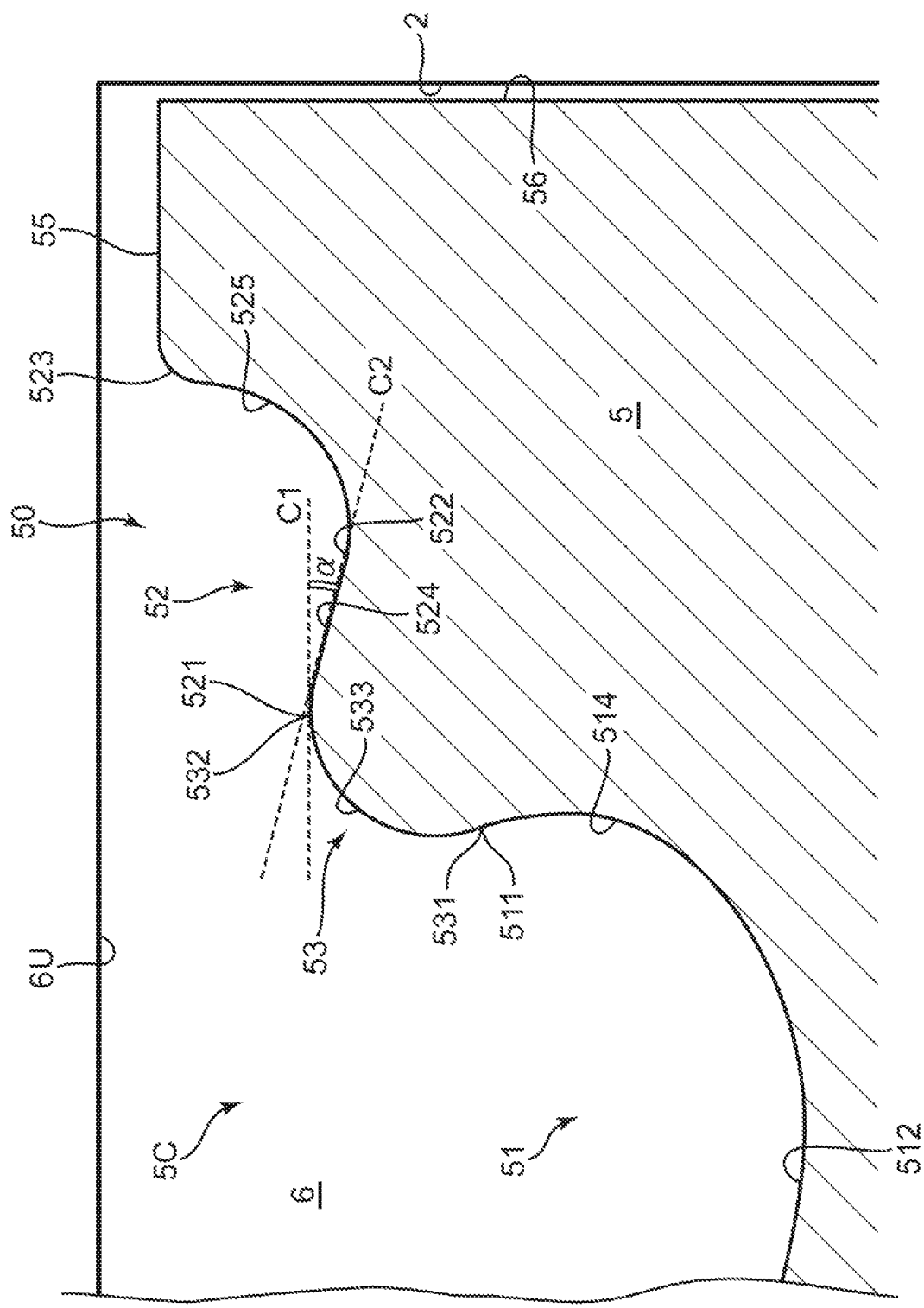
FIG. 3 is an enlarged view of the piston section shown in FIG. 2B.
Figure 4:
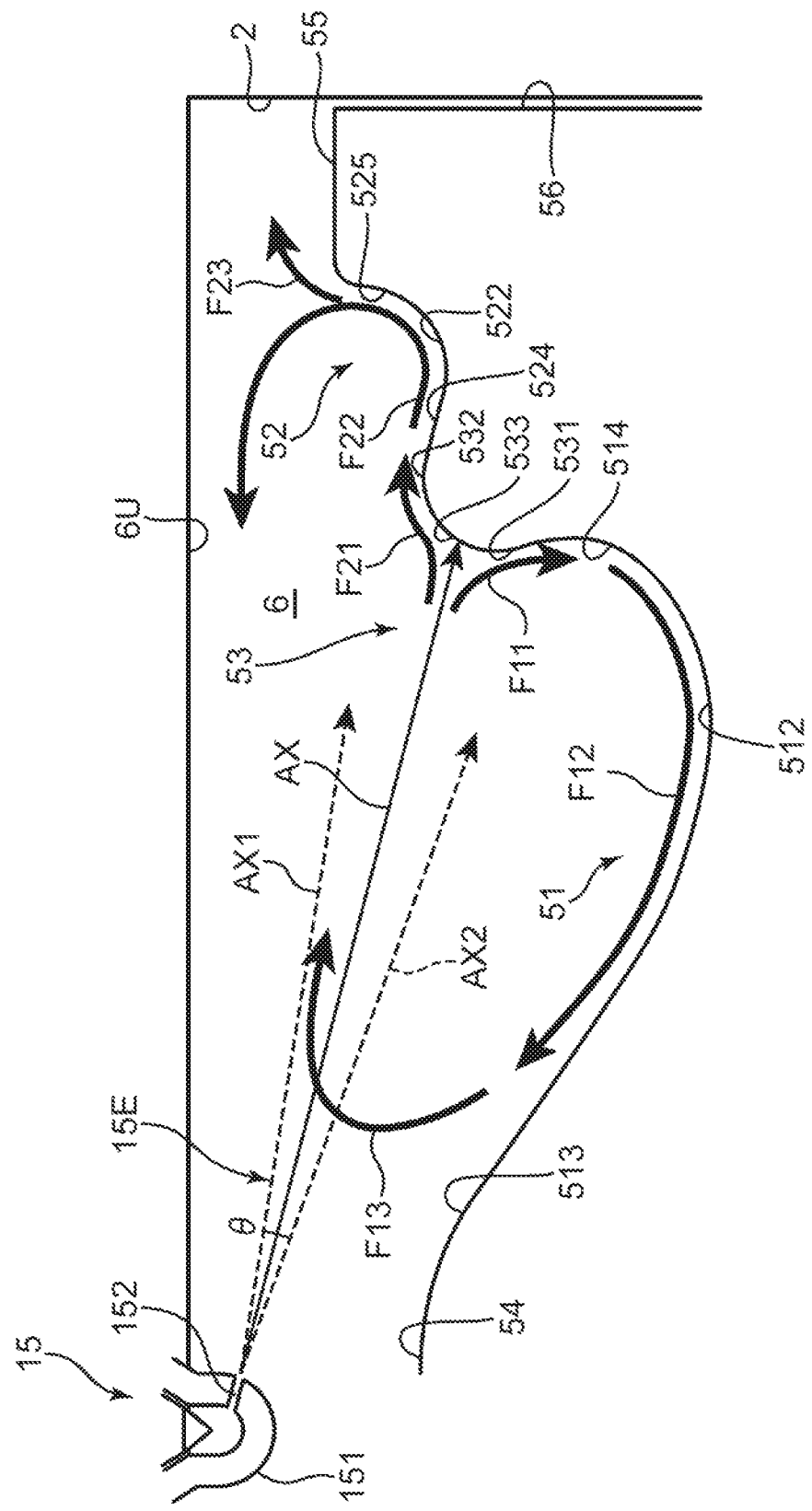
FIG. 4 is a sectional view of the piston for describing a relationship between the crown surface of the piston and an injection axis of fuel by an injector.

One injector 15 (fuel injection valve) for injecting the fuel from its tip into the combustion chamber 6 is attached to the cylinder head 4 for each cylinder 2. The injector 15 injects the fuel supplied through a fuel supply pipe (not shown) into the combustion chamber 6. The injector 15 is assembled to the cylinder head 4 such that the fuel injecting tip (nozzle 151; FIG. 4) is positioned at or near a radial center of the combustion chamber 6. The injector 15 injects the fuel toward a cavity 5C formed on the crown surface 50 of the piston 5 to be described later (FIGS. 2 to 4).

The injector 15 is connected to an accumulator common rail (not shown) common to all the cylinders 2 through the fuel supply pipe. A high-pressure fuel pressurized by a fuel pump (not shown) is stored in the common rail. The fuel accumulated in the common rail is supplied to the injector 15 of each cylinder 2, whereby the fuel is injected from the injector 15 into the combustion chamber 6 at a high pressure (about 50 MPa to 250 MPa). A fuel pressure regulator 16 (not shown in FIG. 1, see FIG. 5) is provided between the fuel pump and the common rail for changing injection pressure, which is the pressure of the fuel injected from the injector 15.

The intake path 30 is connected to one side surface of the cylinder head 4 to communicate with the intake port 9. Air (fresh air) taken in from an upstream end of the intake path 30 is introduced into the combustion chamber 6 through the intake path 30 and the intake port 9. In the intake path 30, an air cleaner 31, the turbocharger 46, a throttle valve 32, an intercooler 33, and a surge tank 34 are disposed in this order from an upstream side of the intake path 30.

The air cleaner 31 removes foreign substances in the intake air to clean the intake air. The throttle valve 32 opens and closes the intake path 30 in conjunction with a pressing down operation of an accelerator (not shown) to adjust a flow rate of intake air in the intake path 30. The turbocharger 46 delivers the intake air to a downstream side of the intake path 30 while compressing the intake air. The intercooler 33 cools the intake air compressed by the turbocharger 46. The surge tank 34 is a tank that is disposed immediately upstream of an intake manifold connected to the intake port 9 and provides a space for evenly distributing the intake air to the plurality of cylinders 2.

An air flow sensor SN3, an intake temperature sensor SN4, an intake pressure sensor SN5, and an intake $O_2$ sensor SN6 are disposed in the intake path 30. The air flow sensor SN3 is disposed downstream of the air cleaner 31 and detects the flow rate of the intake air passing through the portion. The intake temperature sensor SN4 is disposed downstream of the intercooler 33 and detects a temperature of the intake air passing through the portion. The intake pressure sensor SN5 and the intake $O_2$ sensor SN6 are disposed near the surge tank 34, and detect pressure of the intake air and oxygen concentration of the intake air passing through the portions, respectively. Note that although not shown in FIG. 1, an injection pressure sensor SN7 for detecting injection pressure of the injector 15 is provided.

The exhaust path 40 is connected to the other side surface of the cylinder head 4 to communicate with the exhaust port 10. The burnt gas (exhaust gas) generated in the combustion chamber 6 is exhausted to the outside of a vehicle through the exhaust port 10 and the exhaust path 40. An exhaust gas purification device 41 is provided in the exhaust path 40. A three-way catalyst 42 for purifying harmful components contained in the exhaust gas circulating in the exhaust path 40 (HC, CO, NOx), and a diesel particulate filter (DPF) 43 for collecting particulate matters contained in the exhaust gas are incorporated in the exhaust gas purification device 41.

An exhaust $O_2$ sensor SN8 and a differential pressure sensor SN9 are disposed in the exhaust path 40. The exhaust $O_2$ sensor SN8 is disposed between the turbocharger 46 and the exhaust gas purification device 41, and detects oxygen concentration of the exhaust passing through the portion. The differential pressure sensor SN9 detects differential pressure between an upstream end and a downstream end of the DPF 43.

The EGR device 44 includes an EGR path 44A connecting the exhaust path 40 and the intake path 30, and an EGR valve 45 provided in the EGR path 44A. The EGR path 44A connects a portion upstream of the exhaust path 40 from the turbocharger 46 to a portion of the intake path 30 between the intercooler 33 and the surge tank 34. Note that an EGR cooler (not shown) for cooling the exhaust gas returned from the exhaust path 40 to the intake path 30 (EGR gas) by heat exchange is disposed in the EGR path 44A. The EGR valve 45 regulates a flow rate of the exhaust gas circulating through the EGR path 44A.

The turbocharger 46 includes a compressor 47 disposed on an intake path 30 side and a turbine 48 disposed in the exhaust path 40. The compressor 47 and the turbine 48 are connected by a turbine shaft in an integrally rotatable manner. The turbine 48 rotates in response to energy of the exhaust gas flowing through the exhaust path 40. The rotation of the compressor 47 in conjunction with the rotation of the turbine 48 causes the air circulating through the intake path 30 to be compressed (turbocharged).

[Detailed Structure of Piston]

Subsequently, the structure of the piston 5, in particular the structure of the crown surface 50 will be described in detail. FIG. 2A is a perspective view mainly showing an upper portion of the piston 5. The piston 5 includes an upper piston head and a lower skirt portion, but FIG. 2A shows the piston head portion with the crown surface 50 on top. FIG. 2B is a perspective view of the piston 5 with a radial cross section. FIG. 3 is an enlarged view of the radial cross section shown in FIG. 2B. Note that in FIGS. 2A and 2B, a cylinder axial direction A and a radial direction B of the combustion chamber are indicated by arrows. The following description will be made assuming that a plane orthogonal to the cylinder axis is a horizontal plane (assuming that the piston 5 is disposed such that the plane orthogonal to the cylinder axis is a horizontal plane).

The piston 5 includes a cavity 5C, a peripheral flat portion 55, and a side peripheral surface 56. As described above, part of a combustion chamber wall surface that defines the combustion chamber 6 (bottom surface) is formed with the crown surface 50 of the piston 5. The cavity 5C is provided in the crown surface 50. The cavity 5C is a portion where the crown surface 50 is recessed downward in the cylinder axial direction A, and is a portion that receives fuel injection from the injector 15. The peripheral flat portion 55 is an annular flat portion disposed in a region near an outer peripheral edge of the radial direction B of the crown surface 50. The cavity 5C is disposed in a central region of the radial direction B of the crown surface 50 except for the peripheral flat portion 55. The side peripheral surface 56 is a surface in sliding contact with an inner wall surface of the cylinder 2, and is provided with a plurality of ring grooves into which piston rings (not shown) are fitted.

The cavity 5C includes a first cavity portion 51, a second cavity portion 52, a joint portion 53, and a crest portion 54. The first cavity portion 51 is a recess disposed in the central region of the radial direction B of the crown surface 50. The second cavity portion 52 is an annular recess disposed on an outer peripheral side of the first cavity portion 51 in the crown surface 50. The joint portion 53 is a portion that connects the first cavity portion 51 and the second cavity portion 52 in the radial direction B. The crest portion 54 is a mountain-shaped protrusion disposed at a central position in the radial direction B of the crown surface 50 (first cavity portion 51). The crest portion 54 is protruded at a position immediately below the nozzle 151 of the injector 15 (FIG. 4).

The first cavity portion 51 includes a first upper end 511, a first bottom 512 and a first inner end 513. The first upper end 511 is at the highest position in the first cavity portion 51 and is continuous with the joint portion 53. The first bottom 512 is an annular region in top view, and is most recessed in the first cavity portion 51. In the entire cavity 5C, the first bottom 512 is the deepest portion. The first cavity portion 51 has a predetermined depth (first depth) in the cylinder axial direction A at the first bottom 512. In top view, the first bottom 512 is positioned close to an inside of the joint portion 53 in the radial direction B.

The first upper end 511 and the first bottom 512 are connected by a radially recessed portion 514 curved outward in the radial direction B. The radially recessed portion 514 has a portion recessed outward in the radial direction B relative to the joint portion 53. The first inner end 513 is positioned at the radially innermost position in the first cavity portion 51 and is continuous with a lower end of the crest portion 54. The first inner end 513 and the first bottom 512 are connected by a curved surface that is gently curved in a mountain foot shape.

The second cavity portion 52 includes a second inner end 521, a second bottom 522, a second upper end 523, a taper region 524, and a standing wall region 525. The second inner end 521 is positioned at the radially innermost position in the second cavity portion 52 and is continuous with the joint portion 53. The second bottom 522 is the most recessed region in the second cavity portion 52. At the second bottom 522, the second cavity portion 52 has a depth shallower than the first bottom 512 in the cylinder axial direction A. That is, the second cavity portion 52 is a recessed portion positioned above the first cavity portion 51 in the cylinder axial direction A. The second upper end 523 is positioned at the highest position in the second cavity portion 52 and on the radially outermost side, and is continuous with the peripheral flat portion 55.

The taper region 524 is a portion having a plane shape extending from the second inner end 521 to the second bottom 522 and inclined downward to the radial outer side. As shown in FIG. 3, the taper region 524 has an inclination along an inclination line C2 that intersects with a horizontal line (line along the plane orthogonal to the cylinder axis A) C1 extending in the radial direction B at an inclination angle α. The standing wall region 525 is a wall surface formed to rise relatively steeply on the radially outer side relative to the second bottom 522. The wall surface of the second cavity portion 52 has a curved surface curved upward from the horizontal direction from the second bottom 522 to the second upper end 523 in a sectional shape in the radial direction B. The standing wall region 525 is a wall surface close to a vertical wall near the second upper end 523.

The joint portion 53 has a shape protruding radially inward in a bump shape between the first cavity portion 51 positioned on the lower side and the second cavity portion 52 positioned on the upper side in the sectional shape in the radial direction B. The joint portion 53 includes a lower end 531 and a third upper end 532 (upper end of the cylinder axial direction), and a central portion 533 positioned at the center between the lower end 531 and the third upper end 532. The lower end 531 is a continuous portion with the first upper end 511 of the first cavity portion 51. The third upper end 532 is a continuous portion with the second inner end 521 of the second cavity portion 52.

In the cylinder axial direction A, the lower end 531 is the lowermost portion of the joint portion 53, and the third upper end 532 is the uppermost portion. The above-mentioned taper region 524 is also a region extending from the third upper end 532 toward the second bottom 522. The second bottom 522 is positioned below the third upper end 532. That is, the second cavity portion 52 of the present embodiment does not have a bottom surface extending horizontally outward in the radial direction B from the third upper end 532, in other words, the third upper end 532 and the peripheral flat portion 55 are not connected by a horizontal plane. The second cavity portion 52 has a second bottom 522 recessed below the third upper end 532.

The crest portion 54 protrudes upward, and a protruding height of the crest portion 54 is the same as the height of the third upper end 532 of the joint portion 53. The crest portion 54 is more recessed than the peripheral flat portion 55. The crest portion 54 is positioned at the center of the first cavity portion 51 that is circular in top view, whereby the first cavity portion 51 is in a shape of an annular groove formed around the crest portion 54.

[About in-Cylinder Flow after Fuel Injection]

Subsequently, a fuel injection state into the cavity 5C by the injector 15 and a flow of the air-fuel mixture after the injection will be described with reference to FIG. 4. FIG. 4 is a simplified sectional view of the combustion chamber 6. FIG. 4 shows a relationship between the crown surface 50 (cavity 5C) and an injection axis AX of an injected fuel 15E injected from the injector 15. FIG. 4 also shows arrows F11, F12, F13, F21, F22 and F23 schematically representing the flow of the air-fuel mixture after injection.

The injector 15 includes a nozzle 151 disposed to protrude downward from the combustion chamber ceiling surface 6U (lower surface of the cylinder head 4) to the combustion chamber 6. The nozzle 151 includes an injection hole 152 for injecting fuel into the combustion chamber 6. FIG. 4 shows one injection hole 152, but actually, a plurality of injection holes 152 is arranged at an equal pitch in a circumferential direction of the nozzle 151. The fuel injected from the injection hole 152 is injected along the injection axis AX in FIG. 4. The injected fuel diffuses at a spray angle θ. FIG. 4 shows an upper diffusion axis AX1 indicating upward diffusion with respect to the injection axis AX and a lower diffusion axis AX2 indicating downward diffusion. The spray angle θ is an angle formed by the upper diffusion axis AX1 and the lower diffusion axis AX2. The fuel injected from the injection hole 152 is scattered through a region between the upper diffusion axis AX1 and the lower diffusion axis AX2 in side view. Note that the injection axis AX is a central axis of the fuel spray injected from the injector 15, and substantially agrees with an extension line of the central axis of the injection hole 152.

The injection hole 152 can inject the fuel toward the joint portion 53 of the cavity 5C. That is, by causing the injection hole 152 to execute a fuel injection operation at a predetermined crank angle of the piston 5, the injection axis AX can be directed at the joint portion 53. FIG. 4 shows a positional relationship between the injection axis AX and the cavity 5C at the predetermined crank angle. The fuel injected from the injection hole 152 blows at the joint portion 53 while being mixed with air in the combustion chamber 6 to form the air-fuel mixture.

As shown in FIG. 4, the fuel 15E injected toward the joint portion 53 along the injection axis AX collides with the joint portion 53. Then, the fuel 15E is spatially separated into a fuel (arrow F11) traveling in a direction of the first cavity portion 51 (downward) and a fuel (arrow F21) traveling in a direction of the second cavity portion 52 (upward). That is, the fuel injected toward the central portion 533 of the joint portion 53 is separated into upper and lower fuels. Then, the separated fuels are mixed with air present in the first and second cavity portions 51 and 52, and flows along surface shapes of the first and second cavity portions 51 and 52, respectively.

In more detail, the air-fuel mixture traveling in the direction of the arrow F11 (downward) enters the radially recessed portion 514 of the first cavity portion 51 from the lower end 531 of the joint portion 53, and flows downward. Subsequently, the air-fuel mixture changes its flow direction from the downward direction to the inward direction of the radial direction B in accordance with a curved shape of the radially recessed portion 514. The air-fuel mixture then flows in accordance with a bottom surface shape of the first cavity portion 51 having the first bottom 512, as indicated by the arrow F12. At this time, the air-fuel mixture is mixed with air in the first cavity portion 51 to dilute concentration. Due to the presence of the crest portion 54, the bottom surface of the first cavity portion 51 has a shape that rises toward the radial center. Accordingly, the air-fuel mixture flowing in a direction of the arrow F12 is lifted upward, and eventually flows from the combustion chamber ceiling surface 6U toward the radial outer side as shown by the arrow F13. Even in such a flow, the air-fuel mixture is mixed with the air present in the combustion chamber 6 to become a homogeneous, thin air-fuel mixture.

Meanwhile, the air-fuel mixture traveling in a direction of the arrow F21 (upward) enters the taper region 524 of the second cavity portion 52 from the third upper end 532 of the joint portion 53, and travels obliquely downward along the inclination of the taper region 524. Then, as shown by the arrow F22, the air-fuel mixture reaches the second bottom 522. Here, the taper region 524 is a surface having an inclination along the injection axis AX. Therefore, the air-fuel mixture can smoothly flow to the radial outer side. That is, due to the presence of the taper region 524 and the presence of the second bottom 522 positioned below the third upper end 532 of the joint portion 53, the air-fuel mixture can reach a deep position on the radial outer side of the combustion chamber 6.

Thereafter, the air-fuel mixture is lifted upward by a rising curved surface between the second bottom 522 and the standing wall region 525, and flows radially inward along the combustion chamber ceiling surface 6U. In such a flow indicated by the arrow F22, the air-fuel mixture is mixed with the air in the second cavity portion 52 to become a homogeneous, thin air-fuel mixture. Here, due to the presence of the standing wall region 525 extending generally in the vertical direction on the radial outer side of the second bottom 522, the injected fuel (air-fuel mixture) is prevented from reaching an inner peripheral wall of the cylinder 2 (generally, a liner not shown is present). That is, the air-fuel mixture can flow to a place near the radial outer side of the combustion chamber 6 due to the formation of the second bottom 522. However, the presence of the standing wall region 525 prevents interference with the inner peripheral wall of the cylinder 2. This makes it possible to inhibit the occurrence of cooling loss due to the interference.

As described above, the fuel injected toward the joint portion 53 along the injection axis AX collides with the joint portion 53 and is spatially separated, generating the air-fuel mixture using the air present in spaces of the first and second cavity portions 51 and 52. This makes it possible to form a homogeneous, thin air-fuel mixture by widely using the space of the combustion chamber 6, and to inhibit generation of soot and the like during combustion.

[Control Configuration]

Figure 5:
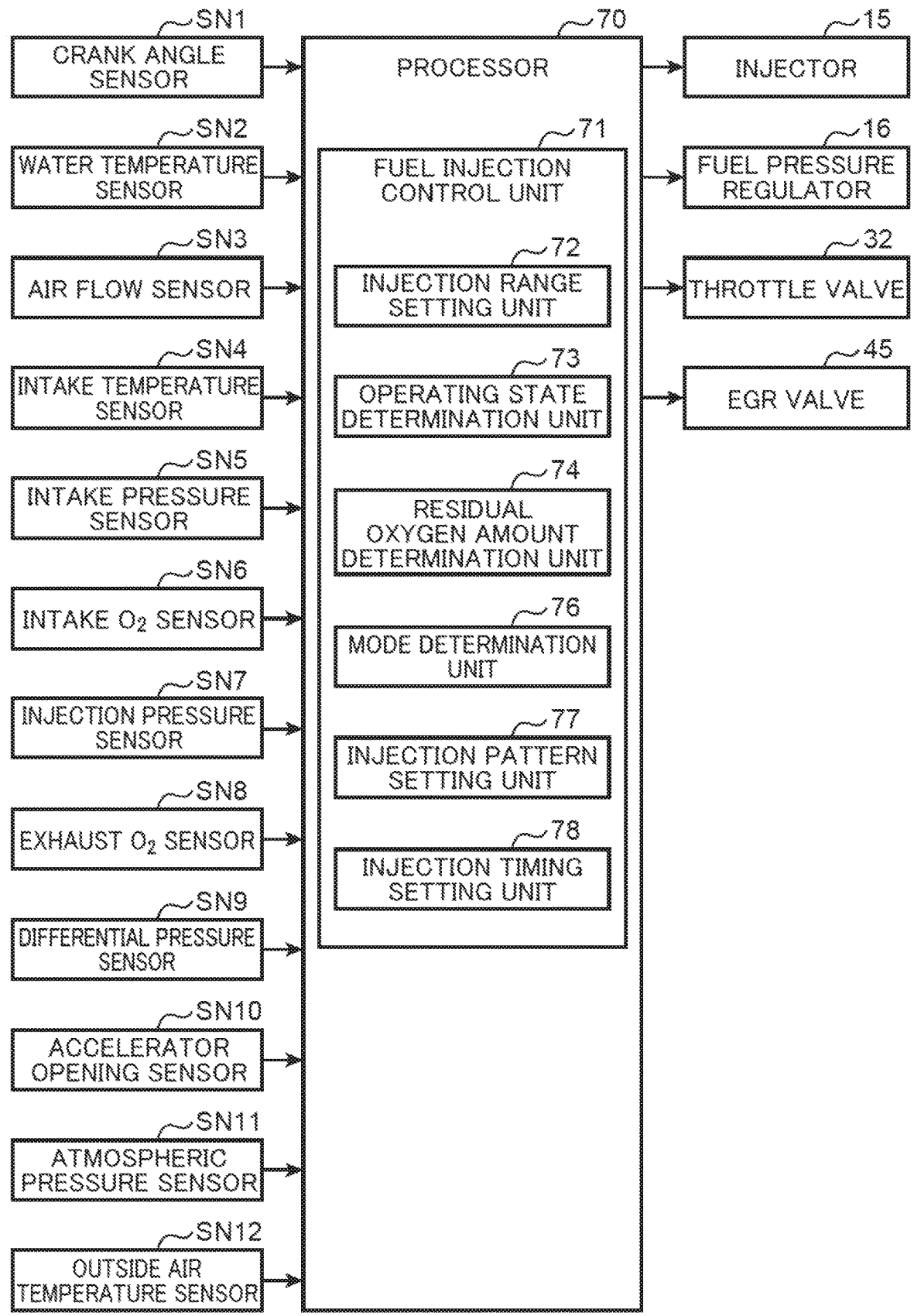
FIG. 5 is a block diagram showing a control system of the diesel engine.

FIG. 5 is a block diagram showing a control configuration of the diesel engine system. The engine system of the present embodiment is centrally controlled by a processor 70 (fuel injection control system for diesel engine). The processor 70 includes components such as a central processing unit (CPU), a read-only memory (ROM), and a random-access memory (RAM). The processor 70 receives detection signals from various sensors mounted on the vehicle. In addition to the sensors SN1 to SN9 described above, the vehicle includes an accelerator opening sensor SN10 for detecting accelerator opening, an atmospheric pressure sensor SN11 for measuring atmospheric pressure of a running environment of the vehicle, and an outside air temperature sensor SN12 for measuring an outside air temperature, that is, an air temperature of the running environment of the vehicle.

The processor 70 is electrically connected to the above-described crank angle sensor SN1, the water temperature sensor SN2, the air flow sensor SN3, the intake temperature sensor SN4, the intake pressure sensor SN5, the intake $O_2$ sensor SN6, the injection pressure sensor SN7, the exhaust $O_2$ sensor SN8, the differential pressure sensor SN9, the accelerator opening sensor SN10, the atmospheric pressure sensor SN11, and the outside air temperature sensor SN12. The processor 70 sequentially receives information detected by the sensors SN1 to SN12, that is, the crank angle, engine rotation speed, engine water temperature, intake flow rate, intake temperature, intake pressure, intake oxygen concentration, injection pressure of the injector 15, exhaust oxygen concentration, differential pressure between before and after the DPF 43, accelerator opening, outside air temperature, and air pressure. Note that the intake pressure sensor SN5 is provided downstream of the compressor 47, and the intake pressure detected by the intake pressure sensor SN5 is the same as the turbocharging pressure. Hereinafter, the intake pressure may be referred to as turbocharging pressure.

The processor 70 controls each part of the engine while executing various determinations and calculations based on input signals from the sensors SN1 to SN12 and other devices. That is, the processor 70 is electrically connected to devices such as the injector 15 (fuel pressure regulator 16), the throttle valve 32, and the EGR valve 45, and outputs control signals to these devices based on results of the above calculations and other information.

The processor 70 functionally includes a fuel injection control unit 71 (fuel injection control device/first injection control module, second injection control module) that controls an operation of the injector 15. In the present embodiment, the fuel injection control unit 71 causes the injector 15 to execute at least a main injection (first injection) to inject fuel at timing when the piston 5 is positioned near a compression top dead center, a pilot injection (second injection) to inject fuel at timing earlier than the main injection, and a low penetration injection (third injection) to inject fuel at timing earlier than the pilot injection or timing later than the main injection.

Here, the main injection and the pilot injection are fuel injections widely used in conventional combustion control. There are many modes of these injections. An after injection is executed at timing later than the main injection in some cases to inhibit soot. In addition to these injections, the present embodiment is characterized in that the low penetration injection is executed with penetration limited than other injections. As will be described in detail later, the low penetration injection is a fuel injection for effectively using the air (oxygen) remaining in the radial central region of the combustion chamber 6. The fuel injection control unit 71 executes: first injection control to execute at least one of the main injection or the pilot injection at timing to inject fuel toward the joint portion 53 of the cavity 5C; and second injection control to execute the low penetration injection to inject fuel only in the radial central region of the combustion chamber 6.

The fuel injection control unit 71 functionally includes an injection range setting unit 72, an operating state determination unit 73, a residual oxygen amount determination unit 74, a mode determination unit 76, an injection pattern setting unit 77, and an injection timing setting unit 78.

The injection range setting unit 72 sets a penetration target for each of the fuel injections described above. In particular, in the low penetration injection described above, the injection range setting unit 72 predicts a mode of the in-cylinder rotational flow formed by the cavity 5C, and sets the penetration target (to be described in detail later with reference to FIG. 9).

The operating state determination unit 73 determines the operating state of the engine body 1 from information such as the engine rotation speed based on detected values of the crank angle sensor SN1, and the engine load based on opening information of the accelerator opening sensor SN10. A result of this determination is used to determine whether the engine body 1 is in an operation mode to execute the low penetration injection.

The residual oxygen amount determination unit 74 determines an oxygen usage state in the combustion chamber 6, that is, whether residual oxygen is generated in the combustion chamber 6, and a remaining oxygen amount level, based on detected values of the exhaust $O_2$ sensor SN8. Note that regardless of the detected values of the exhaust $O_2$ sensor SN8, the residual oxygen amount determination unit 74 may derive the residual oxygen by model calculation with reference to information such as an intake amount detected by the air flow sensor SN3 and a fuel injection amount from the injector 15.

The mode determination unit 76 determines the current operation mode based on the injection pressure of the injector 15 detected by the injection pressure sensor SN7, or by receiving injection pressure setting value data calculated in accordance with the engine load.

The injection pattern setting unit 77 sets the fuel injection pattern of the injector 15. In executing the low penetration injection described above, the injection pattern setting unit 77 sets the injection pattern for the low penetration injection in accordance with the operation mode determined by the mode determination unit 76. Variable elements of this injection pattern includes rough execution timing of the low penetration injection (for example, timing earlier than the pilot injection or timing later than the main injection), the number of low penetration injections (single injection or split injection).

The injection timing setting unit 78 sets the timing of fuel injection of the injector 15 in accordance with various conditions.

[Reason why Low Penetration Injection is Needed]

As described above, by employing the two-step structure cavity including the first and second cavity portions 51 and 52, it is possible to expect an advantage of effectively using the air in the combustion chamber 6, especially the air in a squish region of the radial outer side (a region above the peripheral flat portion 55 in the present embodiment) to form the homogeneous, thin air-fuel mixture, an advantage of inhibiting the occurrence of cooling loss through the inner peripheral wall of the cylinder 2, and other advantages. Meanwhile, the inventors have found that the air usage rate in the radial central region of the combustion chamber 6 tends to decrease when the two-step structure cavity is employed. This point will be described with reference to FIG. 6.

FIG. 6A is a diagram schematically showing an in-cylinder rotational flow when a cavity according to a comparative example is employed. The piston 500 of the comparative example includes a one-step structure cavity 500C. The cavity 500C includes a cavity portion 501, a cavity edge 502 that is an opening edge of the radial outer side of the cavity portion 501, and a crest portion 503 protruding in a central region of the radial direction B. The cavity portion 501 has an egg-shaped curved sectional shape.

In a combustion chamber 6A defined by such a cavity 500C, it is assumed that fuel is injected from an injector (not shown) toward the cavity edge 502 along the injection axis AX. In this case, the in-cylinder flow of the air-fuel mixture containing the injected fuel is a rotational flow E1 indicated by an arrow in FIG. 6A. The rotational flow E1 blows at the cavity edge 502, sequentially travels downward in the axial direction A and inward in the radial direction B along a shape of the cavity portion 501, and is guided upward by the crest portion 503, and makes a flow traveling outward of the radial direction B. Such a rotational flow E1 is a relatively strong vortex, and drawing force EP1 for drawing air AR present in the radial central region of the combustion chamber 6A (near above the crest portion 503) outward of the radial direction B is also strong. Therefore, the air-fuel mixture can be formed by using the air AR of the radial central region.

Meanwhile, FIG. 6B is a schematic diagram showing the in-cylinder rotational flow when the piston 5 including the two-step structure cavity 5C according to the present embodiment is employed. In the combustion chamber 6, it is assumed that fuel is injected from the injector (not shown) to the joint portion 53 along the injection axis AX. In this case, the in-cylinder flow of the air-fuel mixture is branched at the joint portion 53 and separated into a flow toward the first cavity portion 51 on the lower side of the axial direction A and a flow toward the second cavity portion 52 on the upper side. Then, the lower rotational flow E2 and the upper rotational flow E3 are formed in the first cavity portion 51 and the second cavity portion 52, respectively. The lower rotational flow E2 is a flow similar to the rotational flow E1, and sequentially travels downward in the axial direction A and inward in the radial direction B along a shape of the first cavity portion 51, and is guided upward by the crest portion 54, and travels outward in the radial direction B. The upper rotational flow E3 is a flow that is directed from the outer side of the radial direction B to the upper side of the axial direction A and then travels inward in the radial direction B sequentially. It can be understood that the air in the squish region can be used by the formation of the upper rotational flow E3 better than the one-step structure cavity 500C.

However, the two-step structure cavity 5C tends to be inferior to the one-step structure cavity 500C in the usage rate of the air AR in the radial central region of the combustion chamber 6. That is, for the two-step structure cavity 5C, since the rotational flow is separated into the lower rotational flow E2 and the upper rotational flow E3, drawing force EP2 for drawing the air AR outward in the radial direction B is also relatively weak. That is, the lower rotational flow E2 contributing to the drawing of the air AR is weaker than the rotational flow E1 of the comparative example due to the separation of the rotational flow, weakening the vortex-based drawing force EP2.

Figure 7A:
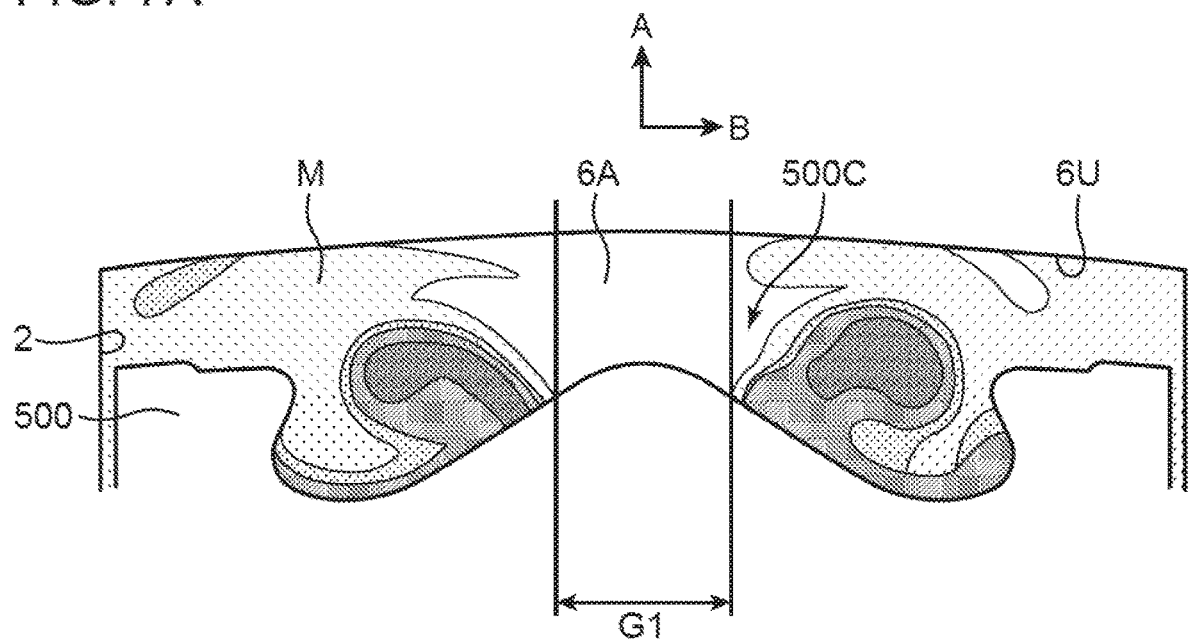
FIG. 7A is a sectional view showing residual air generated in a combustion chamber when the cavity according to the comparative example is employed.
Figure 7B:
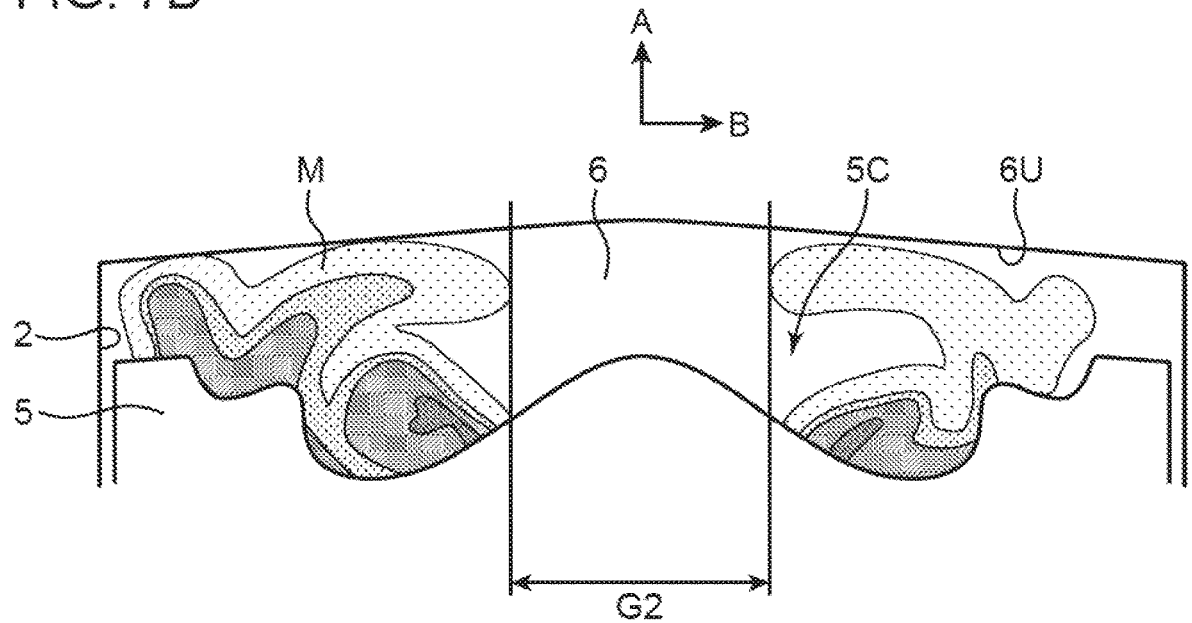
FIG. 7B is a sectional view showing the residual air generated in the combustion chamber when the cavity according to the present embodiment is employed.

FIG. 7A is a sectional view showing a situation of residual air generated in the combustion chamber 6A when the cavity 500C according to the comparative example is employed. FIG. 7B is a sectional view showing a situation of residual air generated in the combustion chamber 6 when the cavity 5C according to the present embodiment is employed. As described with reference to FIG. 6A, the rotational flow E1 of relatively strong vortex is formed in the comparative example. Therefore, as shown in FIG. 7A, the air present in the central region in the radial direction B of the combustion chamber 6A is likely to be drawn into the rotational flow E1, and an oxygen residual feasible region G1 where unused air (oxygen) can remain is a relatively narrow region.

Meanwhile, in the cavity 5C according to the present embodiment, as described with reference to FIG. 6B, since the lower rotational flow E2 is a relatively weak vortex, the air present in the radial central region of the combustion chamber 6 is less likely to be drawn to the lower rotational flow E2. That is, it becomes difficult for the air to travel outward in the radial direction B. Therefore, as shown in FIG. 7B, an oxygen residual feasible region G2 where unused air (oxygen) can remain occupies a wide area in the radial central region. Therefore, a problem arises that the oxygen remaining in the radial central region of the combustion chamber 6 cannot be used effectively.

[Use of Residual Air by Low Penetration Injection]

Figure 8:
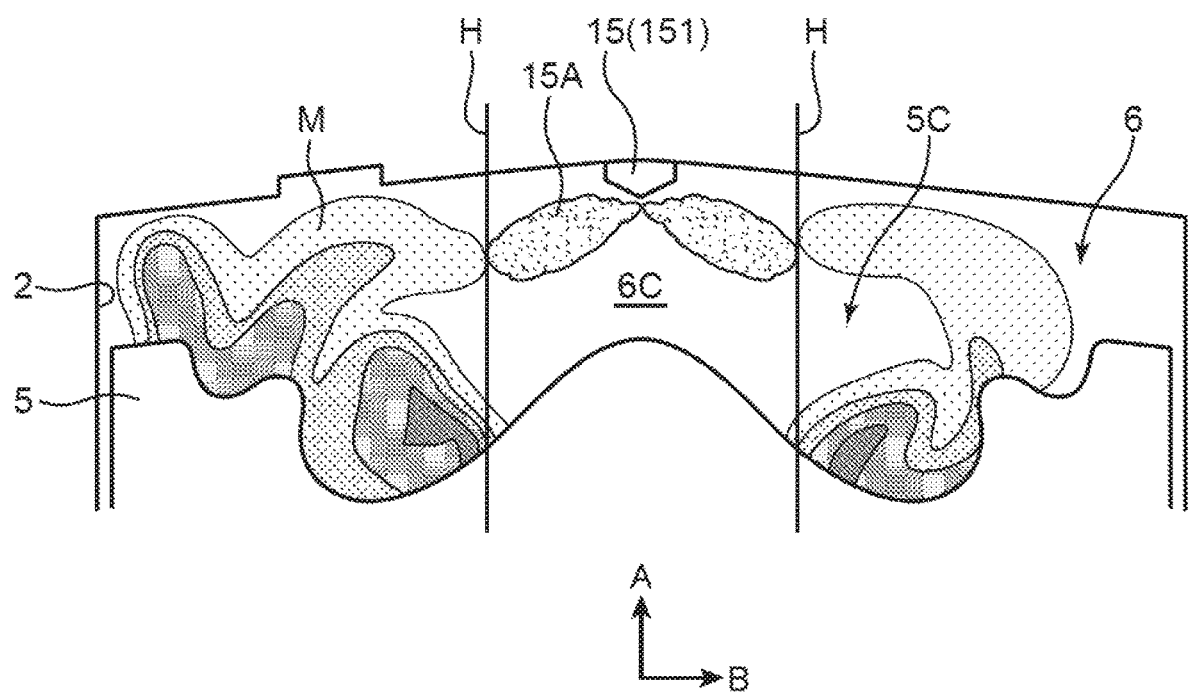
FIG. 8 is a sectional view of the combustion chamber showing execution of low penetration injection.

In view of the above problem, in the present embodiment, in addition to the main injection and the pilot injection, which are generally executed in combustion control of a diesel engine, the low penetration injection is executed to inject fuel only into the radial central region in the combustion chamber 6. FIG. 8 is a sectional view of the combustion chamber 6 showing a situation of executing low penetration injection 15A from the injector 15.

The low penetration injection 15A is an injection of using the air remaining in the central region of the radial direction B of the combustion chamber 6 to generate the air-fuel mixture. For this reason, spray penetration of the low penetration injection 15A is set at an outer edge H of a region where air (oxygen) can be present in the radial central region of the combustion chamber 6. That is, the position reached by the tip of the fuel spray of the low penetration injection 15A is set at the outer edge H. In other words, the low penetration injection 15A is an injection that causes the speed of the spray directed outward in the radial direction B to become zero when reaching the outer edge H. The outer edge H corresponds to the outer edge of the oxygen residual feasible region G2 previously shown in FIG. 7B. Note that a diameter of the oxygen residual feasible region G2 defined by the outer edge H is at most about half a diameter of the combustion chamber 6.

Here, the spray penetration of the low penetration injection 15A may be set on an inner side of the radial direction B from the outer edge H. However, it is preferable to set the outer edge H as the spray penetration from a viewpoint of using the oxygen in the oxygen residual feasible region G2 as much as possible. Note that setting the spray penetration outside of the outer edge H in the radial direction B, which may cause an excessively fuel rich region on an outside of the radial direction B from the outer edge H, is preferably avoided.

From the above reason, when the low penetration injection 15A is executed, the injection range setting unit 72 (FIG. 5: second injection control module) sets the outer edge H as the target line for the spray penetration. This outer edge H, which cannot be detected by a sensor or the like, can be estimated from a position where the rotational flow generated in the combustion chamber 6 (lower rotational flow E2 and upper rotational flow E3) reaches in the radial direction B.

Figure 9A:
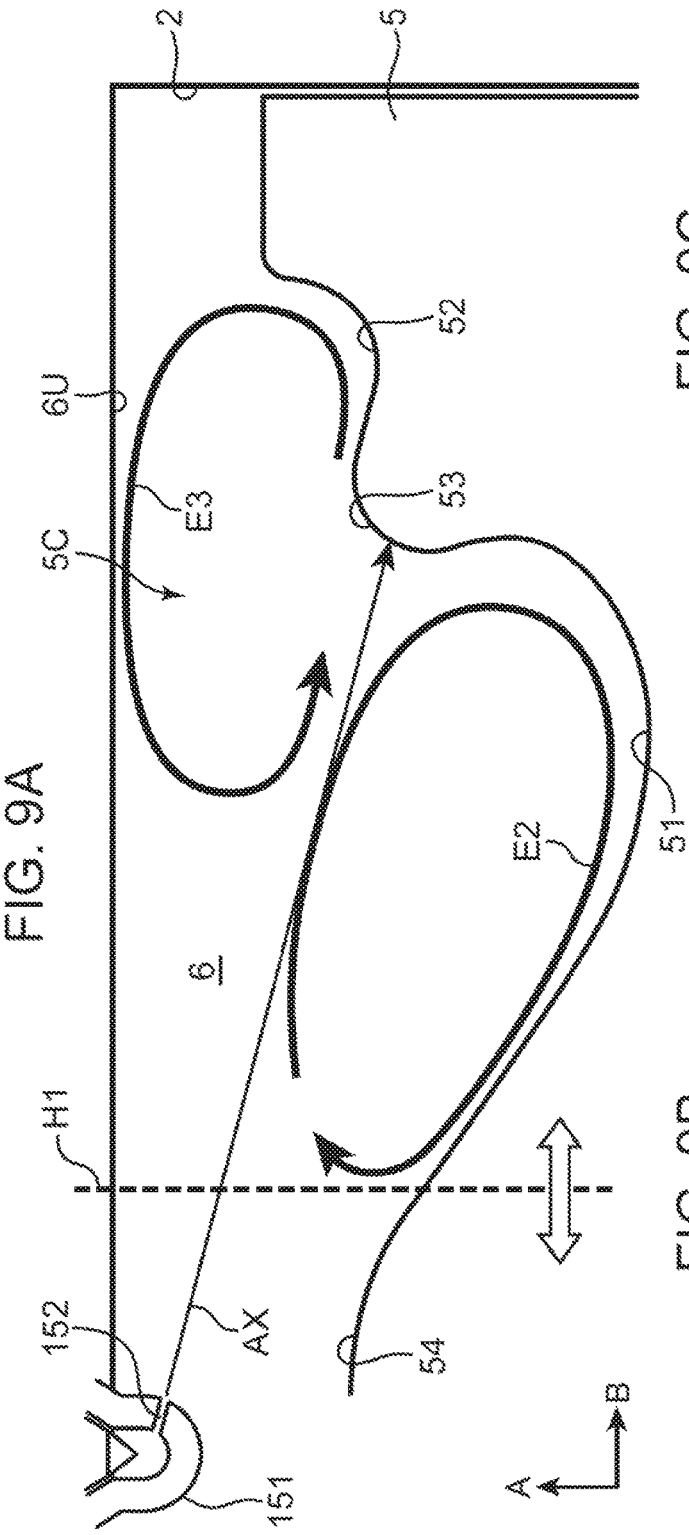
FIGS. 9A to 9C are diagrams for describing a method of setting a target line for the low penetration injection.
Figure 9C:
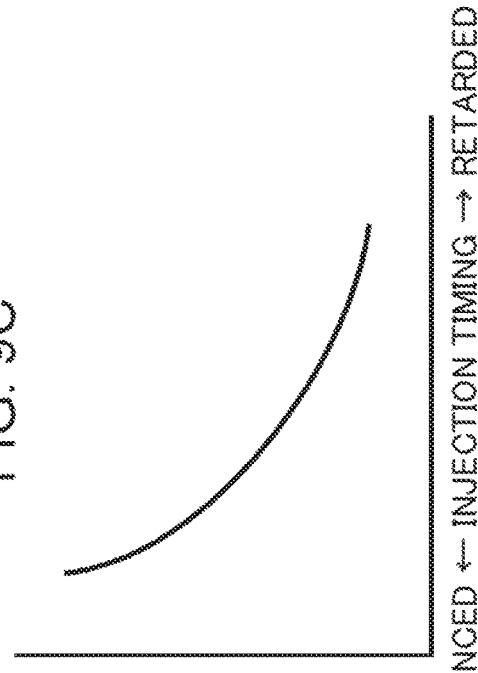
Figure 9B:
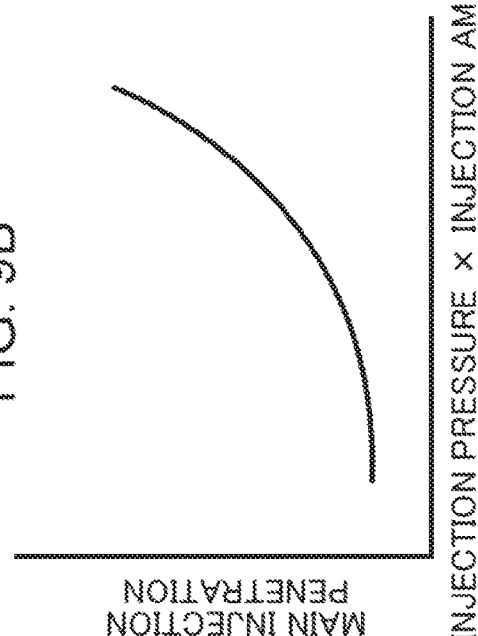

FIGS. 9A to 9C are diagrams for describing a method of setting the outer edge H of the oxygen residual feasible region G2, that is, a method of setting a target line H1 of the low penetration injection 15A. It can be said that the oxygen residual feasible region G2 where unused air will stay is generated in a region where the vortexes of the lower rotational flow E2 and the upper rotational flow E3 are not generated, or a region where the vortexes do not reach. Therefore, the target line H1 can be derived by determining an inner boundary line in the radial direction B reached by the rotational flow. That is, a position where the outermost peripheral portions of the rotational flows E2 and E3 are closest to the center of the combustion chamber 6 in the radial direction B is the above-described boundary line, that is, the target line H1.

Sizes of the rotational flows of the lower rotational flow E2 and the upper rotational flow E3 generated in the combustion chamber 6 having the two-step structure cavity 5C are determined by factors such as spray penetration of injection with the highest energy per cycle, that is, main injection, allocation of the spray penetration to the upper and lower cavity portions 51 and 52, shape (rotational curvature) and volume (rotational distance) of the cavity portions 51 and 52.

As shown in FIG. 9A, the rotational flows E2 and E3 are vortexes having rotational diameters in the radial direction B that fluctuate in accordance with the above factors. Since the shape and volume of the cavity 5C are fixed, a variable factor of the rotational diameter is the spray penetration and allocation of the spray penetration. A position where the outermost peripheral portions of the rotational flows E2 and E3 are closest to the center of the combustion chamber 6 in the radial direction B is the above-described boundary line, that is, the target line H1. In the present embodiment, the target line H1 is exclusively determined by the rotational diameter of the lower rotational flow E2 generated in the first cavity portion 51 disposed radially inward of the second cavity portion 52.

The spray penetration of the main injection is determined by the injection pressure and injection amount of the fuel from the injector 15, as shown in FIG. 9B. That is, as an integrated value of the injection pressure and the injection amount increases, the spray penetration also increases, which means that the rotational diameter of the rotational flow (rotational energy) also increases. Meanwhile, allocation of the spray penetration to the upper and lower cavity portions 51 and 52 depends on a positional relationship between the injection axis AX and the cavity portions 51 and 52, that is, injection timing.

FIG. 9C is a graph showing a relationship between the injection timing and the spray penetration in the lower first cavity portion 51. Since the main injection is generally executed after the compression top dead center, the piston 5 descends more as the injection timing is retarded. Therefore, as the injection timing is retarded, the injection axis AX is directed more at the upper side than the joint portion 53, that is, at the second cavity portion 52 side. That is, as the injection timing is retarded, the spray penetration allocated to the first cavity portion 51 becomes smaller, and hence the rotational diameter of the lower rotational flow E2 (rotational energy) also becomes smaller.

As described above, the rotational diameter of the lower rotational flow E2 can be estimated from the injection pressure, injection amount, and injection timing of the main injection. The injection range setting unit 72 (FIG. 5) estimates the size of the oxygen residual feasible region G2 (FIG. 7B) generated in the radial central region of the combustion chamber 6 based on the estimated rotational diameter of the lower rotational flow E2. Next, the injection range setting unit 72 sets the outer edge H of the oxygen residual feasible region G2 (FIG. 8) as the target line H1 for the low penetration injection. Then, the fuel injection control unit 71 refers to the injection pressure set based on the operating states of the engine at this control timing, sets the injection amount with which the penetration target is the target line H1, and then executes the low penetration injection. By executing such low penetration injection, the air-fuel mixture can be formed from the air remaining in the oxygen residual feasible region G2 and the fuel sprayed by the low penetration injection. As a result, it is possible to effectively use the air in the combustion chamber 6 to form the homogeneous, thin air-fuel mixture, and to implement high-quality diesel combustion in which generation of soot and the like is inhibited.

<Low Penetration Injection Control>

Subsequently, a first embodiment of low penetration injection control will be described.

FIGS. 10A to 10E are time charts showing modes of the low penetration injection (third injection) according to the present embodiment. Here, timing of injection executed per one cycle (crank angle CA) and its injection amount are schematically shown. The injection pattern setting unit 77 of the fuel injection control unit 71 sets at least injection patterns as shown in FIGS. 10A to 10E.

Figure 10A:
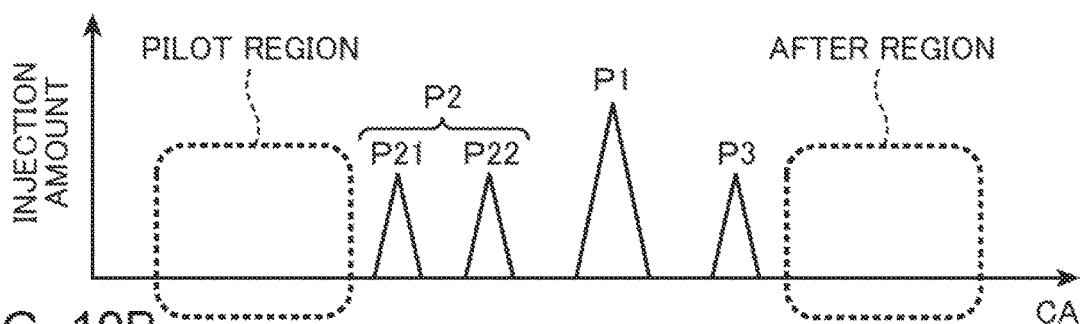
FIGS. 10A to 10E are time charts showing a mode of the low penetration injection.

FIG. 10A shows a basic injection pattern when the low penetration injection is not executed. FIG. 10A shows an example in which main injection P1, pilot injection P2, and after injection P3 are executed as the basic injection pattern. The main injection P1 is an injection having the largest energy (injection amount), and is an injection that is executed near the compression top dead center (for example, 2 to 6 deg_ATDC). The pilot injection P2 is an injection that is executed at timing earlier than the main injection P1 (for example, 1 to 10 deg_BTDC), and is executed to create the air-fuel mixture in advance to increase the ignition quality. FIG. 10A shows an example in which the pilot injection P2 is executed twice, first pilot injection P21 and second pilot injection P22. The after injection P3 is an injection that is executed at timing later than the main injection P1 (for example, 8 to 15 deg_ATDC), and is executed to burn the fuel completely and prevent generation of soot. Note that the spray injections P1, P2, and P3 are injections in which the spray penetration is not limited to the central region within the target line H1, like the low penetration injection described above.

Figure 10B:
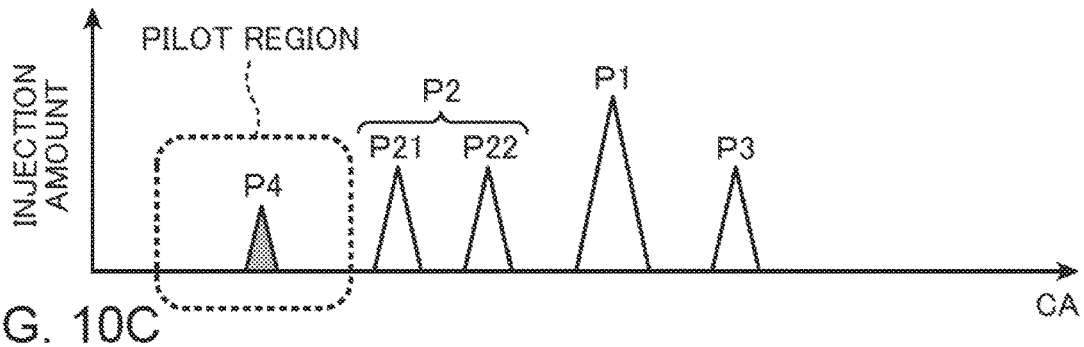

FIG. 10B shows an injection pattern in which low penetration injection P4 is executed in the PILOT region that is advanced from the pilot injection P2. Since the spray penetration is limited to the target line H1 in the low penetration injection P4, the injection amount is generally smaller than the injections P1, P2, P3 of the basic injection pattern.

Figure 10C:
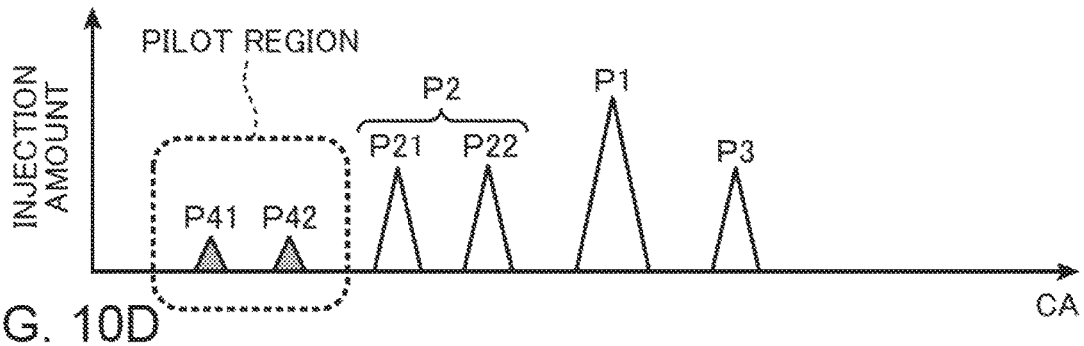

FIG. 10C shows an injection pattern in which the low penetration injection P4 is split into two injections and executed twice, that is, low penetration injections P41 and P42 are executed in the PILOT region. That is, in the present embodiment, the injector 15 can split the low penetration injection into multiple times and execute a plurality of the low penetration injection.

Figure 10D:
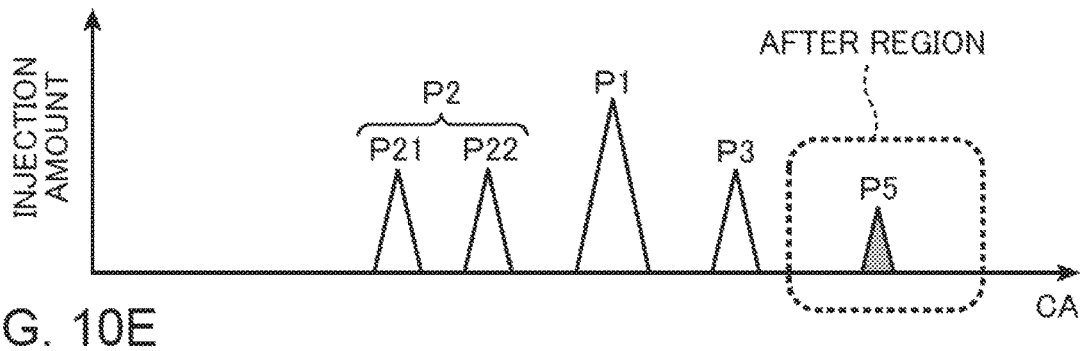

FIG. 10D shows an injection pattern in which low penetration injection P5 is executed in the AFTER region that is retarded from the after injection P3. In this case, the injection amount of the low penetration injection P5 is smaller than the injection amount of the injection P1, P2, or P3 of the basic injection pattern.

Figure 10E:
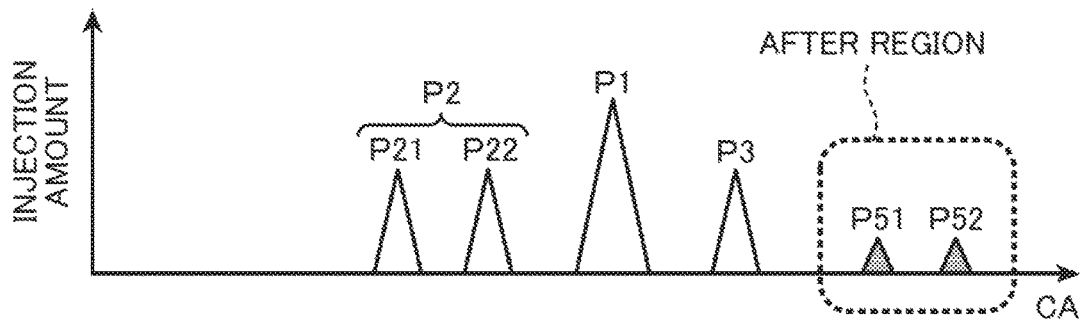

FIG. 10E shows an injection pattern in which the low penetration injection P5 is split into two injections and executed twice, that is, low penetration injections P51 and P52 are executed in the AFTER region.

In the present embodiment, these five injection patterns are switched depending on the operation mode.

FIG. 11 is a diagram showing the basic control divisions in the low penetration injection control according to the present embodiment. In FIG. 11, a horizontal axis is fuel injection pressure of the injector 15, and shows set maximum injection pressure FPmax and set minimum injection pressure FPmin.

In the present embodiment, the injection pressure is kept constant during at least one combustion cycle. Therefore, the injection pressure of the low penetration injection, pilot injection, main injection, and after injection, which are executed at least in the same combustion cycle, are all about the same pressure. As this injection pressure, pressure suitable as injection pressure of the main injection is employed in accordance with the operating state of the engine body 1 (engine load and rotation speed).

A vertical axis of FIG. 11 is an amount of fuel injected from the injector 15 by the low penetration injection. In more detail, the vertical axis of FIG. 11 is the amount of fuel injected from the injector 15 by one low penetration injection (single low penetration injection) (hereafter, this fuel amount is referred to as a single low penetration injection amount). A slant line H2 of FIG. 11 is a line connecting the injection pressure and the injection amount when the spray penetration (tip position of the spray) of the low penetration injection is the target line H1 (FIG. 9), that is, the slant line H2 is a basic control target line of the injection pressure and the injection amount for setting the spray penetration of the low penetration injection as the target line H1.

As described above, the spray penetration increases as the injection pressure increases, and the spray penetration increases as the injection amount increases. Accordingly, the control target line H2 is a line along which the injection amount (single low penetration injection amount) decreases as the injection pressure increases.

In the present embodiment, as described above, the injection pressure is set in accordance with the operating state of an engine body 1. Accordingly, in order to spray the low penetration injection to the target line H1, the injection amount is adjusted in accordance with the set injection pressure. That is, the low penetration injection control of the present embodiment implements the spray penetration of the target line H1 by receiving injection pressure data as an existing value and setting the injection amount in accordance with the injection pressure. The control target line H2 represents such an injection amount setting line.

The first region shown in FIG. 11 is a region where the injection pattern shown in FIG. 10C is executed, that is, the first region is a region where the low penetration injection is split and executed twice in the PILOT region (hereinafter referred to as PILOT split injection as appropriate). The first region is set as a region in which the injection pressure is equal to or greater than a second reference injection pressure FP2 and is equal to or less than the set injection pressure FPmax.

The second region shown in FIG. 11 is a region where the injection pattern shown in FIG. 10B is executed, that is, the second region is a region where the single low penetration injection is executed in the PILOT region (hereinafter referred to as PILOT single injection as appropriate). The second region is set as a region in which the injection pressure is less than the second reference injection pressure FP2 and is equal to or greater than a third reference injection pressure FP3.

The third region shown in FIG. 11 is a region where the injection pattern shown in FIG. 10E is executed, that is, the third region is a region where the low penetration injection is split and executed twice in the AFTER region (hereinafter referred to as AFTER split injection as appropriate). The third region is set as a region in which the injection pressure is equal to or greater than a fourth reference injection pressure FP4 and is less than the third reference injection pressure FP3.

The fourth region shown in FIG. 11 is a region where the injection pattern shown in FIG. 10D is executed, that is, the fourth region is a region where the single low penetration injection is executed in the AFTER region (hereinafter referred to as AFTER single injection as appropriate). The fourth region is set as a region in which the injection pressure is equal to or greater than the set minimum injection pressure FPmin and is less than the fourth reference injection pressure FP4.

The third reference injection pressure FP3 is an injection pressure when the injection amount on the control target line H2 is the third reference injection amount Q3. The third line L3 in FIG. 11 indicates a line on which the injection amount is the third reference injection amount Q3. The third reference injection amount Q3 corresponds to "reference amount" in the claims. In the present embodiment, the third reference injection amount Q3 is preset and stored in the fuel injection control unit 71.

The third line L3 (third reference injection amount Q3) is an upper limit of the injection amount of the low penetration injection when using the PILOT region.

Specifically, when supplying an excessive amount of fuel to the combustion chamber 6 by the low penetration injection in the PILOT region, an excessively rich (high fuel concentration) air-fuel mixture is formed in the radial central region of the combustion chamber 6. This may cause the air-fuel mixture to undergo premature ignition. That is, the fuel by the low penetration injection may start combustion before desired timing (for example, before the fuel by the pilot injection or main injection starts combustion). Also, a reaction of air and fuel by the low penetration injection may accelerate a reaction of fuel by the pilot injection or main injection, and the fuel by these injections may start combustion earlier than desired timing. The third line L3 is an upper limit line of the injection amount of the low penetration injection that can avoid such premature ignition when the low penetration injection is executed in the PILOT region. In the present embodiment, in order to avoid the premature injection, the first region and the second region where the low penetration injection is executed in the PILOT region are set in the region where the injection amount of the low penetration injection is equal to or less than this third line L3, that is, equal to or less than the third reference injection amount Q3.

Note that the third line L3 is an upper limit line to prevent the formation of the excessively rich air-fuel mixture in the combustion chamber 6 to avoid the premature ignition as described above. The third line L3 is also an upper limit line of the total amount of fuel to be supplied into the combustion chamber 6 by the low penetration injection (total amount per one combustion cycle) in the PILOT region. Therefore, in the second region, when the low penetration injection is executed twice in the PILOT region, it is necessary to prevent the total amount of the single low penetration injection amount from exceeding this third line L3 (third reference injection amount Q3).

Here, when the low penetration injection is executed in the AFTER region, the fuel by the low penetration injection is burned after combustion of the fuel by the pilot injection or main injection, and thus there is no problem of premature ignition. However, the injection in the AFTER region, which is executed after combustion of the main injection, generates heat mainly while the piston is descending, and the fuel consumption loss increases. In contrast, the fuel injected in the PILOT region is burned in good thermal efficiency near the compression top dead center, which contributes to the generation of effective torque. Therefore, in the present embodiment, to improve the fuel efficiency, when the injection amount of the low penetration injection (total amount per one combustion cycle) is equal to or less than the third level L3 (third reference injection amount Q3), the low penetration injection in the PILOT region is executed on a priority basis. The low penetration is executed in the AFTER region only when the injection amount of the low penetration injection (total amount) becomes higher than the third level L3.

In this way, the third reference injection pressure FP3 and the third line L3 (third reference injection amount Q3) are the upper-limit injection pressure and the lower-limit injection amount of the region where the low penetration injection is executed in the AFTER region. However, these are not functional injection limitations of the low penetration injection in the AFTER region. These are limitations from a viewpoint that the injection amount region that cannot be covered by the PILOT region due to the problem of premature ignition is compensated by the AFTER region, assuming that the PILOT region is applied on a priority basis. However, a diesel engine has characteristics that as the injection pressure decreases, a particle size of spray particles increases and soot is more likely to be generated. Therefore, fuel injection in the AFTER region when the injection pressure is lower than the third reference injection pressure FP3 will provide an effect of burning soot again.

The second reference injection pressure FP2 is an injection pressure at which the injection amount is a second reference injection amount Q2 on the control target line H2. The second line L2 in FIG. 11 indicates a line on which the injection amount is the second reference injection amount Q2. This second reference injection amount Q2 corresponds to "reference single injection amount" in the claims. In the present embodiment, the second reference injection amount Q2 is preset and stored in the fuel injection control unit 71.

The second line L2 (second reference injection amount Q2) is a lower limit of the single low penetration injection amount when executing the PILOT single injection.

Specifically, when the single low penetration injection amount becomes smaller than the second line L2 (second reference injection amount Q2), one low penetration injection cannot secure a sufficient amount of fuel for the air present in the oxygen residual feasible region G2. If the sufficient amount of fuel is not secured, the air-fuel mixture of fuel and air by the low penetration injection may cause ignition delay. That is, there is a possibility that combustion may not occur in the oxygen residual feasible region G2, and the air in the oxygen residual feasible region G2 cannot be used sufficiently effectively. Alternatively, there is a possibility that the combustion start timing may be delayed from desired timing and appropriate combustion may not occur. The second line L2 is a lower limit line of the single low penetration injection amount that allows avoidance of such an ignition delay and effective use of air.

Thus, in the present embodiment, in order to avoid the ignition delay and to use more air effectively, the first region for executing the PILOT split injection is set in a region where the single low penetration injection amount is less than the second line L2 (second reference injection amount Q2), and the low penetration injection is executed twice in this region. In addition, the second region for executing the PILOT single injection is set in a region where the single low penetration injection amount is larger than the second line L2 (second reference injection amount Q2).

Here, in the present embodiment, as described above, the low penetration injection is executed twice in the first region. A level of the second line L2 (second reference injection amount Q2) is set half or less of the level of the third line L3 (third reference injection amount Q3). Accordingly, even if the low penetration injection is executed twice in the first region, the total injection amount can be kept less than the third line L3 (third reference injection amount Q3).

The first line L1 is a lower limit line for securing the injection amount that prevents ignition delay in the oxygen residual feasible region G2 in the PILOT split injection to be executed in the first region. If the single low penetration injection amount decreases further, the required injection amount cannot be secured even by split injection, and as a result, combustion does not occur in the oxygen residual feasible region G2 or the combustion start timing is delayed. That is, the first line L1 is a line that is set from a viewpoint of providing the minimum amount of heat that can cause combustion using oxygen in the region G2. Note that the first line L1 is also an injection amount at which the injection pressure is the set maximum injection pressure FPmax on the control target line H2. Actually, the first line L1 is also a line beyond which the injection amount cannot be reduced.

The fourth reference injection pressure FP4 is an injection pressure when the injection amount on the control target line H2 is a fourth reference injection amount Q4. The fourth line L4 in FIG. 11 indicates a line on which the injection amount is the fourth reference injection amount Q4. This fourth reference injection amount Q4 also corresponds to "reference single injection amount" in the claims. In more detail, the second reference injection amount Q2 corresponds to the "reference single injection amount" when executing the low penetration injection in the PILOT region. The fourth reference injection amount Q4 corresponds to the "reference single injection amount" when executing the low penetration injection in the AFTER region. In the present embodiment, the fourth reference injection amount Q4 is preset and stored in the fuel injection control unit 71.

The fourth line L4 (fourth reference injection amount Q4) is a lower limit of the single low penetration injection amount when executing the AFTER single injection.

Specifically, when the single low penetration injection amount is less than the fourth line L4 (fourth reference injection amount Q4), one low penetration injection may not be able to secure sufficient injection amount for the oxidation of soot, and split injection is required.

Therefore, in the present embodiment, in order to secure the injection amount necessary for the oxidation of soot, the third region for executing the AFTER split injection is set in the region where the single low penetration injection amount is less than the fourth line L4 (fourth reference injection amount Q4), and the low penetration injection is executed twice. In addition, the fourth region for executing the AFTER single injection is set in the region where the single low penetration injection amount is equal to or greater than the fourth line L4 (fourth reference injection amount Q4).

The fifth line L5 is an upper limit line that limits the injection amount to prevent the oxygen residual feasible region G2 from becoming excessively rich in the AFTER single injection of the fourth region. If the injection amount per one injection is larger than the fifth line L5, a heat amount that is equal to or greater than the oxygen amount present in the oxygen remaining probability region G2 is given, and new soot can be generated.

In this way, in the low penetration injection, the injection patterns are used in accordance with the division of the first to fourth regions. The flow of setting these injection patterns will be described with reference to the flowchart of FIG. 12.

First, the fuel injection control unit 71 of the processor 70 (FIG. 5) obtains information on a running region of the vehicle (operating state of the engine body 1) from the sensors SN1 to SN12 shown in FIG. 5 and other sensors (step S1).

Subsequently, the operating state determination unit 73 determines whether the engine rotation speed detected by the crank angle sensor SN1 and the engine load detected by the accelerator opening sensor SN10 fall within a range of a predetermined running region (operating state) determined in advance (step S2). The predetermined running region is a running region in which the oxygen residual feasible region G2 shown in FIG. 7B is formed. As the region not included in the given running region, for example, a case where the spray penetration of the main injection P1 or the pilot injection P2 is larger than a predetermined setting amount is exemplified. The predetermined setting amount is spray penetration that makes the injection amount such that air cannot remain in the radial central region of the combustion chamber 6. The region not included in the given running region generally corresponds to a high-load, high-rotation speed running region.

When the engine rotation speed and the engine load do not fall within the predetermined running region (NO in step S2), that is, when the oxygen residual feasible region G2 is not formed, the operating state determination unit 73 determines that the engine body 1 is not in the operation mode for executing the low penetration injection. In this case, the fuel injection control unit 71 prohibits the low penetration injection (step S3). This is because when the low penetration injection is executed in such a running region, the air-fuel mixture becomes rich and the combustibility and fuel efficiency are deteriorated.

On the other hand, when the engine rotation speed and the engine load fall within the predetermined running region (YES in step S2), the oxygen residual feasible region G2 is formed in the radial central region of the combustion chamber 6. In this case, the residual oxygen amount determination unit 74 determines whether an oxygen amount equal to or greater than a predetermined value remains in the oxygen residual feasible region G2 (step S4). This determination is executed based on the detected value of the exhaust $O_2$ sensor SN8 or model calculation as described above. When the oxygen amount having the predetermined value or more does not remain in the oxygen residual feasible region G2 (NO in step S4), the fuel injection control unit 71 prohibits the low penetration injection because there is no oxygen to be used by executing the low penetration injection in the first place (step S3).

On the other hand, when the residual oxygen amount determination unit 74 determines that the oxygen amount equal to or greater than the predetermined value remains in the oxygen residual feasible region G2 (YES in step S4), the low penetration injection is executed. In this case, next, the injection range setting unit 72 sets the outer edge H of the oxygen residual feasible region G2, that is, the target line H1 based on the injection amount, injection pressure, and injection timing of the main injection as described above (Step S5). Subsequently, the mode determination unit 76 sets the control target line H2 based on the target line H1 (step S6). For example, the control target line H2 for a plurality of target lines H1 is preset and stored in the mode determination unit 76. The mode determination unit 76 extracts the line corresponding to the set target line H1 from the stored plurality of control target lines H2.

Next, the mode determination unit 76 calculates the injection amount for which the injection pressure is the detected value or the setting value of the injection pressure on the set control target line H2 based on the injection pressure of the injector 15 detected by the injection pressure sensor SN7, or by receiving injection pressure setting value data calculated in accordance with the engine load (step S7). That is, the mode determination unit 76 calculates the injection amount that allows the position reached by the tip of the fuel spray to be the target line H1 in the current injection pressure (hereinafter referred to as target injection amount).

Next, the mode determination unit 76 determines whether the calculated target injection amount is less than the third reference injection amount Q3 (step S8). When the target injection amount is less than the third reference injection amount Q3 (YES in step S8), the mode determination unit 76 further determines whether the target injection amount is less than the second reference injection amount Q2 (step S8). Upon determination that the target injection amount is less than the second reference injection amount Q2 (YES in step S9), the mode determination unit 76 sets the PILOT split injection as the injection pattern (step S10).

Meanwhile, upon determination that the target injection amount is less than the third reference injection amount Q3 (YES in step S8) and is equal to or greater than the second reference injection amount Q2 (NO in step S9), the mode determination unit 76 sets the PILOT single injection as the injection pattern (step S11).

Also, upon determination that the target injection amount is equal to or greater than the third reference injection amount Q3 (NO in step S8), subsequently, the mode determination unit 76 determines whether the target injection amount is less than the fourth reference injection amount Q4 (step S12). In this determination, upon determination that the target injection amount is less than the fourth reference injection amount Q4 (YES in step S12), the mode determination unit 76 sets the AFTER split injection as the injection pattern (step S13).

On the other hand, upon determination that the target injection amount is equal to or greater than the fourth reference injection amount Q4 (NO in step S12), the mode determination unit 76 sets the AFTER single injection as the injection pattern (step S14).

When the injection pattern is determined in this way, the fuel injection control unit 71 drives the injector 15, such that the injection pattern is the determined injection pattern and the injection amount of the low penetration injection (single low penetration injection amount for split injection) is the target injection amount.

In this way, in the present embodiment, when the injection pressure is high and the fuel spray penetration (reached distance) is likely to be large, the injection amount is set in a direction in which the injection amount of the low penetration injection per one injection is reduced, that is, the fuel spray penetration (reached distance) is reduced. This makes it possible to prevent the range the fuel spray by the low penetration injection reaches from becoming too large or too small, and to effectively use the air remaining in the radial central region of the combustion chamber more securely.

Moreover, even if the injection amount of single low penetration injection is set small due to the high injection pressure, the low penetration injection is executed multiple times, which can increase the total injection amount of the low penetration injection, and can use much of the air remaining in the radial central region of the combustion chamber.

Another Embodiment

Figure 13:
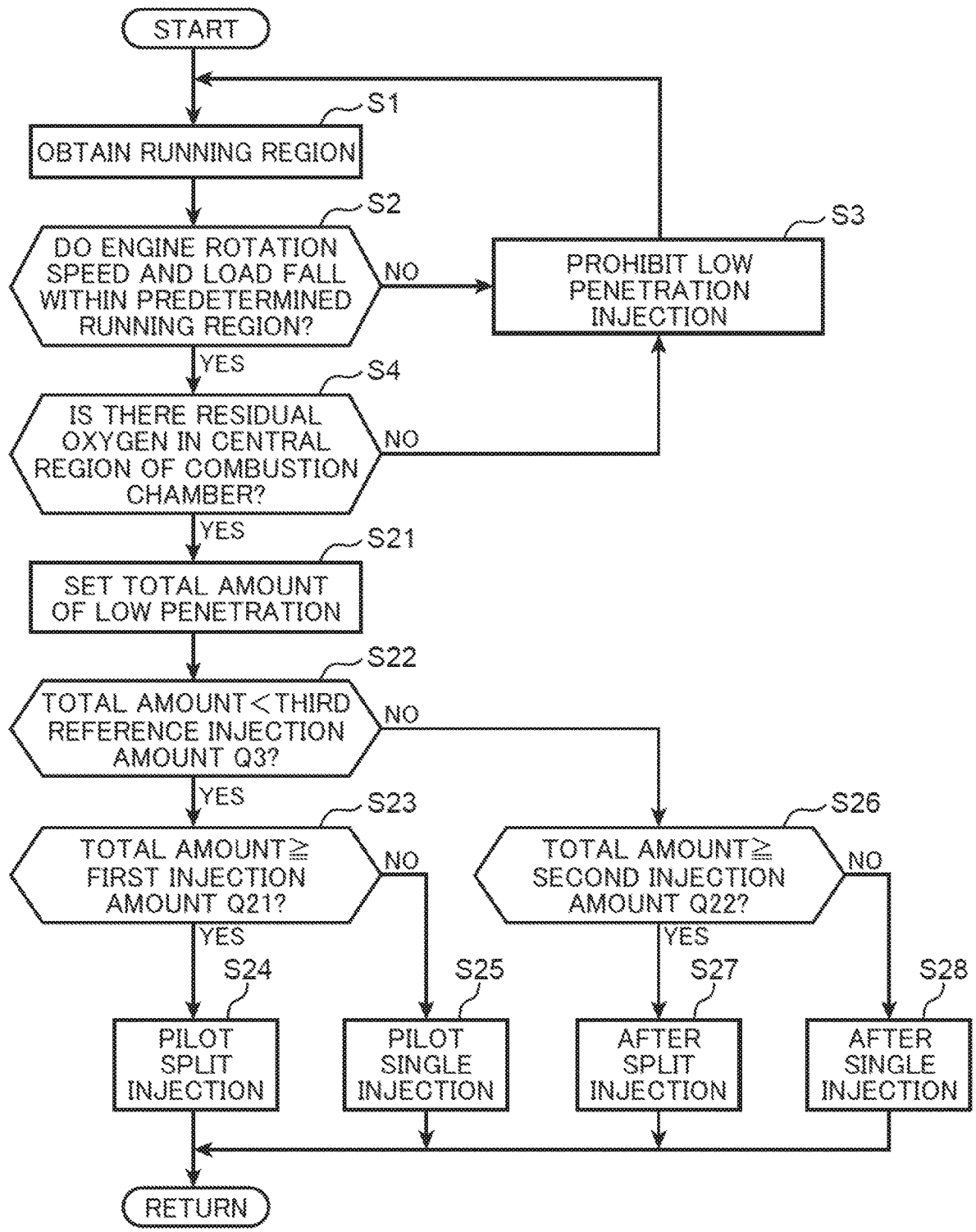
FIG. 13 is a flowchart showing low penetration injection control according to a second embodiment.

The above-described first embodiment has described a case where the injection pattern is set based on the injection pressure and the single low penetration injection amount, but the injection pattern may be set based on the total low penetration injection amount. FIG. 13 shows a procedure flow of setting the injection pattern in this case (second embodiment).

In the second embodiment, steps S1 to S4 are executed as in the first embodiment. Here, only steps in and after step S4 will be described.

When the residual oxygen amount determination unit 74 determines that the oxygen amount equal to or greater than a predetermined value remains in the radial central region (YES in step S4), the mode determination unit 76 sets a target value for the total injection amount of the low penetration injection to be executed in one combustion cycle (hereinafter referred to as target total amount) (step S21) In the second embodiment, the residual oxygen amount determination unit 74 estimates the oxygen amount remaining in the combustion chamber 6, and the mode determination unit 76 calculates the target value for the total amount based on the oxygen amount estimated by the residual oxygen amount determination unit 74. Specifically, the mode determination unit 76 sets the target value for the total amount to increase as the oxygen amount remaining in the combustion chamber 6 increases.

Next, the mode determination unit 76 determines whether the target total amount is less than the third reference injection amount Q3 described in the first embodiment (step S22). Upon determination that the target total amount is less than the third reference injection amount Q3 (YES in step S22), next, the mode determination unit 76 determines whether the target total amount is equal to or greater than a first injection amount Q21 set in advance (step S23). The first injection amount Q21 is smaller than the third reference injection amount Q3, and is preset and stored in the mode determination unit 76.

Upon determination that the target total amount is equal to or greater than the first injection amount Q21 (YES in step S23), that is, when the target total amount is equal to or greater than the first injection amount Q21 and less than the third reference injection amount Q3, the mode determination unit 76 sets the PILOT split injection as the injection pattern (step S24). On the other hand, upon determination that the target total amount is less than the first injection amount Q21 (NO in step S23), the mode determination unit 76 sets the PILOT single injection as the injection pattern (step S25). Here, the first injection amount Q21 corresponds to "second reference amount" in the claims.

On the other hand, upon determination that the target total amount is equal to or greater than the third reference injection amount Q3 (No in step S22), next, the mode determination unit 76 determines whether the target total amount is equal to or greater than the second injection amount Q22 set in advance (step S26). The second injection amount Q22 is larger than the third reference injection amount Q3, and is preset and stored in the mode determination unit 76.

Upon determination that the target total amount is equal to or greater than the second injection amount Q22 (YES in step S26), the mode determination unit 76 sets the AFTER split injection as the injection pattern (step S27). On the other hand, upon determination that the target total amount is less than the second injection amount Q22 (NO in step S26), that is, when the target total amount is equal to or greater than the third reference injection amount Q3 and less than the second injection amount Q22, the mode determination unit 76 sets the AFTER single injection as the injection pattern (step S28). Here, the second injection amount Q22 also corresponds to "second reference amount" in the claims. That is, the first injection amount Q21 is the "second reference amount" when executing the low penetration injection in the PILOT region, and the second injection amount Q22 is the "second reference amount" when executing the low penetration injection in the AFTER region.

When the injection pattern is determined in this way, the fuel injection control unit 71 drives the injector 15 such that the injection pattern is the determined injection pattern and the total injection amount of the low penetration injection is the target total injection amount.

In this way, in the second embodiment, in a case of executing the low penetration injection in the PILOT region, when the total injection amount of the low penetration injection is equal to or greater than the predetermined first injection amount Q21, the low penetration injection is split and executed. In a case of executing the low penetration injection in the AFTER region, when the total injection amount of the low penetration injection is equal to or greater than the predetermined second injection amount Q22, the low penetration injection is split and executed.

Note that, in this second embodiment, the second injection amount Q22 for switching between executing single injection and executing split injection when executing the low penetration injection in the AFTER region may be set in accordance with the situation of generation of soot. For example, the second injection amount Q22 may be set at a large value under an operating condition that soot is likely to be generated, and the second injection amount Q22 may be set at a small value under an operating condition that soot is unlikely to be generated.

[Operational Effects]

The fuel injection control system for a diesel engine according to the present embodiment described above produces the following effects. The bottom of the combustion chamber 6 of the diesel engine to be controlled is defined by the crown surface 50 including the first and second cavity portions 51 and 52 and the joint portion 53 connecting the first and second cavity portions 51 and 52. The fuel injection control unit 71 causes the injector 15 to execute the main injection P1 or the pilot injection P2 directed at the joint portion 53. This will develop a tendency that the in-cylinder flow of the air-fuel mixture is separated at the joint portion 53, the in-cylinder rotational flow becomes relatively weak, and the air near the central region of the radial direction B of the combustion chamber 6 is less likely to be drawn to the radial outer side.

However, according to the present embodiment, in addition to the normal main injection P1 and the pilot injection P2, the fuel injection control unit 71 causes the injector 15 to execute the low penetration injection to inject fuel only into the radial central region in the combustion chamber 6, that is, to set the outer edge H of the central region (FIG. 8) where oxygen can remain due to weakening of the in-cylinder rotational flow as the penetration target. Therefore, the air-fuel mixture can be formed from the air remaining in the radial central region of the combustion chamber 6 and the spray fuel by the low penetration injection. Also, since the outer edge H is set as the penetration target, the air present in the radial central region can be fully used to form the air-fuel mixture. As a result, it is possible to effectively use the air in the combustion chamber 6 to form the homogeneous, thin air-fuel mixture, and to implement high-quality diesel combustion in which generation of soot and the like is inhibited.

Also, when the total injection amount of the low penetration injection per one injection cycle is less than the third reference injection amount Q3, the fuel injection control unit 71 executes the low penetration injection in the PILOT region. When the total injection amount of the low penetration injection is equal to or greater than the third reference injection amount Q3, the fuel injection control unit 71 executes the low penetration injection in the AFTER region. This makes it possible to increase the fuel efficiency while avoiding premature ignition, and to effectively use air in the combustion chamber 6 more securely.

Also, in a case of executing the low penetration injection in the PILOT region, when the injection amount of the low penetration injection per one injection is small, the fuel injection control unit 71 executes the low penetration injection twice. This makes it possible to increase the total amount of the low penetration injection, and to effectively use more air remaining in the radial central region of the combustion chamber 6.

In particular, the first embodiment reduces the single low penetration injection amount when the injection pressure is high, so as to implement the control target line H2 shown in FIG. 11, that is, to cause the position the fuel spray of the low penetration injection reaches to be the target line H1. As a result, when the injection pressure is high, the single low penetration injection amount decreases. In contrast, this embodiment can secure a large total amount of the low penetration injection as described above, and can effectively use plenty of air more securely, together with the effect that the fuel spray can reach the target line H1.

Similarly, in a case of executing the low penetration injection in the AFTER region, when the injection amount of the low penetration injection per one injection is small, the fuel injection control unit 71 executes the low penetration injection twice, and can effectively use plenty of air more securely.

Also, in the second embodiment, in a case of executing the low penetration injection in the PILOT region, when the total amount of fuel injected by the low penetration injection per one combustion cycle is less than the first injection amount Q21, the low penetration injection is executed singly during one combustion cycle. When the total amount is equal to or greater than the first injection amount Q21, the low penetration injection is executed twice. Also, in a case of executing the low penetration injection in the AFTER region, when the total amount of fuel injected by the low penetration injection per one combustion cycle is less than the second injection amount Q22, the low penetration injection is executed singly during one combustion cycle. When the total amount is equal to or greater than the second injection amount Q22, the low penetration injection is executed twice. This makes it possible to prevent a large amount of fuel from being injected into the combustion chamber 6 at one time resulting in deterioration of mixing with air, and to burn the fuel by the low penetration injection appropriately. Also, it is possible to prevent the fuel spray injected by the low penetration injection from exceeding the radial central region of the combustion chamber 6 due to a large amount fuel injection at one time into the combustion chamber 6, and to use the air remaining in the radial central region more securely. When the total amount is small, it is possible to reduce the number of times to drive the injector 15 while improving the mixing.

Figure 12:
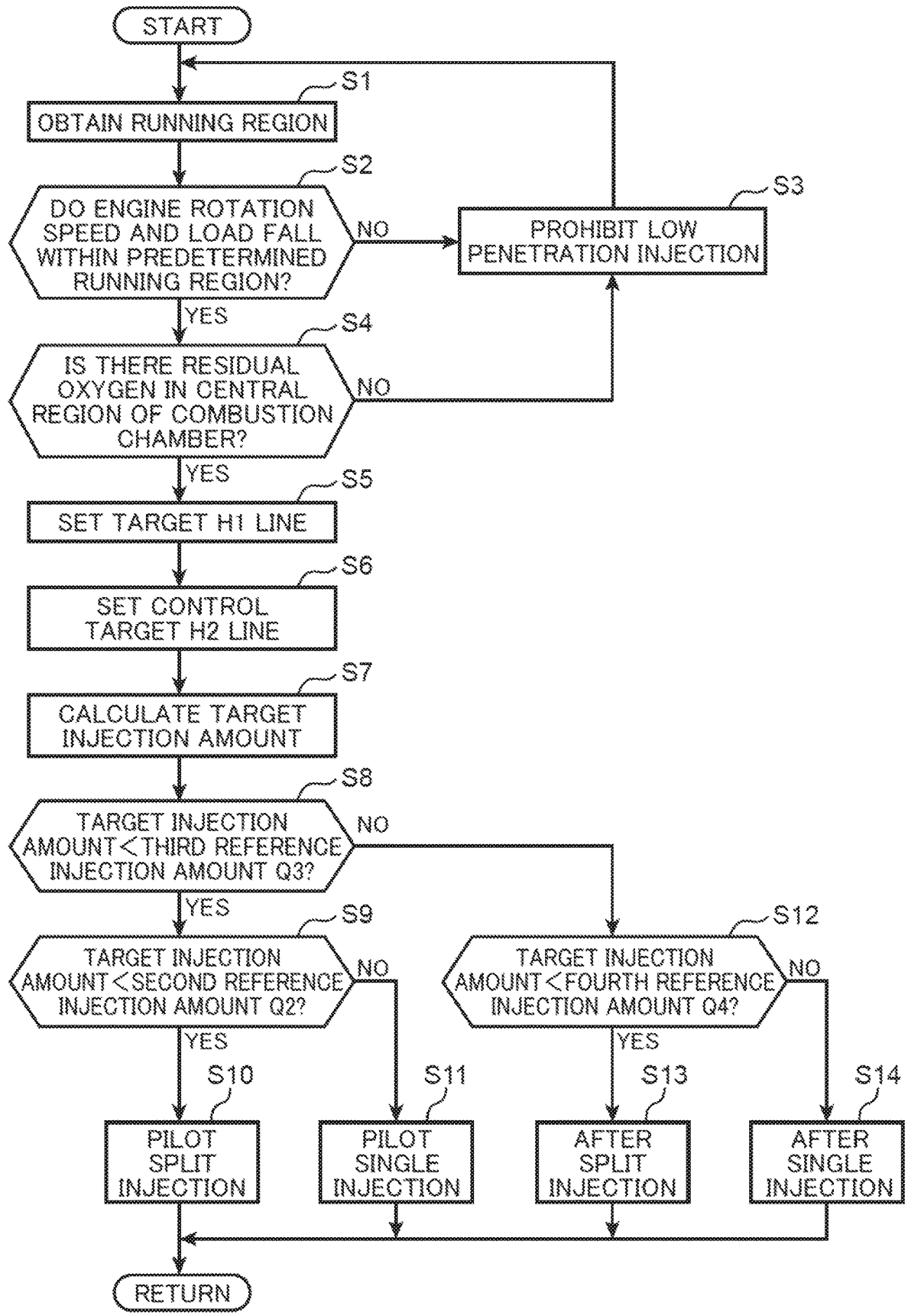
FIG. 12 is a flowchart showing low penetration injection control according to the first embodiment.

Also, when the spray penetration of the main injection P1 or the pilot injection P2 is larger than the predetermined setting amount, the fuel injection control unit 71 prohibits the low penetration injection (steps S2 and S3 of FIGS. 12 and 13). The spray penetration of the main injection P1 or the pilot injection P2 is larger than the predetermined setting amount, for example, when the engine load is large, which is a case where the fuel injection amount in these injections is relatively large. In such a case, there will be no air remaining in the radial central region of the combustion chamber 6 (oxygen residual feasible region G2 is not generated). Therefore, by prohibiting the low penetration injection, it is possible to prevent the air-fuel mixture from becoming excessively rich.

Furthermore, the fuel injection control unit 71 prohibits the low penetration injection under the condition that the oxygen amount of the radial central region of the combustion chamber 6 is less than or equal to the predetermined value (steps S4 and S3 of FIGS. 12 and 13). Under the condition that the oxygen amount of the radial central region of the combustion chamber 6 is thin, even under the condition that the oxygen residual feasible region G2 is generated, there is no need to execute the low penetration injection in the first place. Under such a condition, the fuel injection control unit 71, which prohibits the low penetration injection. This makes it possible to prevent unnecessary fuel consumption.

Modifications

The embodiments of the present invention have been described above, but the present invention is not limited to these embodiments, and for example, the following modified embodiments can be employed.

(1) The above-described embodiments have shown examples in which the main injection P1, the pilot injection P2, and the after injection P3 are executed as the basic injection pattern (FIG. 10). The basic injection pattern is required to include at least the main injection P1 and the pilot injection P2, and may omit the after injection P3. Also, the above-described embodiments have shown examples in which the pilot injection P2 is executed twice, the first pilot injection P21 and the second pilot injection P22. Instead, the pilot injection P2 may be a single injection or three or more injections. Furthermore, the above-described embodiments have shown examples in which the main injection P1 is an injection with the maximum energy (injection amount). However, according to another mode, the pilot injection P2 may have the maximum injection amount, and the pilot injection P2 may be directed at the joint portion 53. In this case, the fuel injection control system is configured such that the injection range setting unit 72 sets the outer edge H of the oxygen residual feasible region G2, that is, the target line H1, based on the injection amount, injection pressure, and injection timing of the pilot injection P2.

(2) When executing the low penetration injection by split injection, the above-described embodiments have shown examples of splitting the low penetration injection into two injections, but may split the low penetration injection into three or more injections.

(3) The above-described embodiments have described a case where the second reference injection amount Q2, the third reference injection amount Q3, and the fourth reference injection amount Q4 are set in advance and stored in the fuel injection control unit 71. However, these reference injection amounts Q2 to Q4 may be changed in accordance with the operating state of the engine. For example, the fuel injection control system may be configured as follows.

As described above, the third reference injection amount Q3 is an upper limit value of the injection amount that allows avoidance of premature ignition when the low penetration injection is executed in the PILOT region. When the air-fuel mixture has low ignition quality, premature ignition is unlikely to occur, and the injection amount can be increased. Therefore, under an operating condition that the air-fuel mixture has low ignition quality, the third reference injection amount Q3 may be increased. Conversely, under an operating condition that the air-fuel mixture has high ignition quality, the third reference injection amount Q3 may be decreased. For example, when the outside air temperature is high, the air pressure is high, the engine rotation speed is high, the engine load is high, and the engine water temperature is high, then the air-fuel mixture has high ignition quality. In an opposite case, the air-fuel mixture has low ignition quality. Also, when the EGR gas amount is small or the turbocharging pressure is high, the air-fuel mixture has high ignition quality. Meanwhile, when the EGR gas amount is large and the turbocharging pressure is low, such as when a large amount of EGR gas is introduced into the combustion chamber 6 at a stretch, or when turbocharging temporarily fails to catch up, then the air-fuel mixture has low ignition quality. Therefore, the third reference injection amount Q3 may be set to be larger when the outside air temperature, air pressure, engine rotation speed, engine load, engine water temperature, turbocharging pressure, and EGR gas amount are high (large) than when the outside air temperature, air pressure, engine rotation speed, engine load, engine water temperature, turbocharging pressure, and EGR gas amount are low (small).

Note that the above-described specific embodiments disclose a fuel injection control system for a diesel engine having the following configurations.

A fuel injection control system for a diesel engine according to one aspect of the present invention includes: a combustion chamber of an engine, formed with a lower surface of a cylinder head, a cylinder, and a crown surface of a piston; a fuel injection valve configured to inject fuel into the combustion chamber; and a fuel injection control device including a processor and configured to control an operation of the fuel injection valve. The crown surface of the piston includes a cavity. The cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion. The fuel injection valve is configured to inject the fuel toward the cavity and is disposed at or near a radial center of the combustion chamber. The fuel injection control device is configured to cause the fuel injection valve to execute at least: a main injection to inject the fuel at timing when the piston is positioned near a compression top dead center; a pilot injection to inject the fuel at timing earlier than the main injection; and a low penetration injection to inject the fuel at timing earlier than the pilot injection or timing later than the main injection. The fuel injection control device is configured to execute: a first injection control module to execute at least one of the main injection or the pilot injection at timing of injecting the fuel toward the joint portion; and a second injection control module to execute the low penetration injection to inject the fuel only into the radial central region of the combustion chamber. The second injection control module executes the low penetration injection at timing later than the main injection when a total amount of the fuel injected by the low penetration injection per one combustion cycle is equal to or greater than a predetermined reference amount. The second injection control module executes the low penetration injection at timing earlier than the pilot injection when the total amount of the fuel injected by the low penetration injection per one combustion cycle is less than the reference amount.

With this fuel injection control system, part of the combustion chamber is formed with the crown surface including the first and second cavity portions, and the fuel injection of the main injection or the pilot injection is executed toward the joint portion. Therefore, there is a tendency that the in-cylinder flow of the air-fuel mixture is separated at the joint portion, the in-cylinder rotational flow becomes relatively weak, and the air near the radial central region of the combustion chamber is unlikely to be drawn into the radial outer side. However, the fuel injection control system executes the low penetration injection in addition to the normal main injection and pilot injection. The low penetration injection is executed such that the fuel is injected only into the radial central region of the combustion chamber. Therefore, the air-fuel mixture can be formed with the air remaining in the radial central region of the combustion chamber and the spray fuel by the low penetration injection. As a result, it is possible to effectively use the air in the combustion chamber to form the homogeneous, thin air-fuel mixture, and to implement high-quality diesel combustion in which generation of soot and the like is inhibited.

Here, when the total amount of fuel injected by the low penetration injection is large, a rich (high fuel concentration) air-fuel mixture is formed with the fuel by the low penetration injection. As a result, there is a possibility that premature ignition may occur in which the fuel by the low penetration injection, pilot injection, or main injection starts combustion at timing earlier than desired timing. In contrast, this system executes the low penetration at timing later than the main injection when the total amount of fuel injected by the low penetration injection is equal to or greater than the reference amount. This makes it possible to effectively use air in the combustion chamber while preventing premature ignition. In addition, when the total amount of fuel injected by the low penetration injection is less than the reference amount and premature ignition is unlikely to occur, the low penetration injection is executed at timing earlier than the pilot injection. This makes it possible to effectively use the air in the combustion chamber while increasing the fuel efficiency by converting the combustion energy of the fuel by the low penetration injection into effective torque.

In the above-described configuration, preferably, the fuel injection valve is configured to execute a single low penetration injection or low penetration injections split into multiple times, the second injection control module executes the single low penetration injection during one combustion cycle when the total amount of the fuel injected by the low penetration injection per one combustion cycle is less than a predetermined second reference amount, and the second injection control module executes the low penetration injections split into multiple times during one combustion cycle when the total amount is equal to or greater than the second reference amount.

This configuration makes it possible to prevent a large amount of fuel from being injected into the combustion chamber at one time and deteriorating the mixing with air when the total amount per one combustion cycle injected by the low penetration injection is large. Therefore, the fuel by the low penetration injection can be burned appropriately. In addition, it is possible to prevent the fuel spray injected by the low penetration injection from exceeding the radial central region of the combustion chamber due to a large amount fuel injection at one time into the combustion chamber. Also, it is possible to use the air remaining in the radial central region more securely. When the total amount is small, it is possible to reduce the number of times of driving the fuel injection valve while improving the mixing.

In the above-described configuration, preferably, the fuel injection valve is configured to execute the low penetration singly or split the low penetration injection into a plurality of single low penetration injections, the second injection control module sets an injection amount of each of the single low penetration injections to be smaller when injection pressure of the fuel injection valve is high than when the injection pressure of the fuel injection valve is low, when the set injection amount of the single low penetration injection is equal to or greater than a predetermined reference single injection amount, the second injection control module executes the low penetration injection singly during one combustion cycle, when the injection amount of the single low penetration injection is less than the reference single injection amount, the second injection control module executes the low penetration injections split into multiple times during one combustion cycle.

With this configuration, when the injection pressure is high and the penetration (reached distance) of the fuel spray is likely to to be large, the injection amount is set in a direction in which the injection amount per one injection is reduced, that is, the penetration (reached distance) of the fuel spray becomes smaller. This makes it possible to prevent the range the fuel spray by the low penetration injection reaches from becoming too large or too small, and to effectively use the air remaining in the radial central region of the combustion chamber more securely.

Moreover, even when the injection amount of single low penetration injection is set low due to the high injection pressure, it is possible to increase the total injection amount of the low penetration injection, and to use much of the air remaining in the radial central region of the combustion chamber.

In the above-described configuration, the second injection control module preferably executes the low penetration injection to cause an outer edge of the radial central region of the combustion chamber to be spray penetration.

This configuration sets the position of the outer edge of the radial central region of the combustion chamber as a target for the spray penetration. This makes it possible to make full use of the air present in the radial central region to form the air-fuel mixture, and as a result, to further inhibit generation of soot and the like.

In the above-described configuration, preferably, the second injection control module estimates an oxygen residual feasible region that is generated in the radial central region of the combustion chamber based on injection pressure, injection amount, and injection timing of the main injection or the pilot injection by the first injection control module, and the second injection control module executes the low penetration injection to cause an outer edge of the oxygen residual feasible region to be spray penetration.

This configuration estimates the oxygen residual feasible region where oxygen to be used remains from an injection control result by the first injection control module, and executes the low penetration injection for the estimated oxygen residual feasible region. Therefore, combustion with effective use of residual oxygen in the combustion chamber can be implemented.

A fuel injection control system for a diesel engine according to another aspect of the present invention includes: a combustion chamber of an engine, formed with a lower surface of a cylinder head, a cylinder, and a crown surface of a piston; a fuel injection valve configured to inject fuel into the combustion chamber; and a fuel injection control device including a processor and configured to control an operation of the fuel injection valve. The crown surface of the piston includes a cavity. The cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion. The fuel injection valve is configured to inject the fuel toward the cavity and is disposed at or near a radial center of the combustion chamber. The fuel injection control device is configured to cause the fuel injection valve to execute at least: a first injection to inject the fuel at timing when the piston is positioned near a compression top dead center; a second injection to inject the fuel at timing earlier than the first injection; and a third injection to inject the fuel at timing earlier than the second injection or timing later than the first injection. The fuel injection control device is configured to execute: a first injection control module to execute at least one of the first injection or the second injection at timing of injecting the fuel toward the joint portion; and a second injection control module to execute the third injection. The second injection control module: estimates a rotational diameter of a rotational flow generated in the first cavity portion based on injection pressure, injection amount, and injection timing of the first injection or the second injection by the first injection control module; the rotational flow being an in-cylinder flow of an air-fuel mixture containing the injected fuel, estimates an oxygen residual feasible region generated in the radial central region of the combustion chamber based on the estimated rotational diameter; executes the third injection to spray the fuel only into the estimated oxygen residual feasible region; and executes the third injection at timing later than the first injection when a total amount of the fuel injected by the third injection per one combustion cycle is equal to or greater than a predetermined reference amount, and executes the third injection at timing earlier than the second injection when the total amount of the fuel injected by the third injection per one combustion cycle is less than the reference amount.

A fuel injection control method for a diesel engine according to still another aspect of the present invention is a fuel injection control method for a diesel engine, the diesel engine including: a combustion chamber formed with a lower surface of a cylinder head, a cylinder, and a crown surface of a piston; and a fuel injection valve configured to inject fuel into the combustion chamber. The crown surface of the piston of the diesel engine includes a cavity, the cavity includes: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion, the fuel injection valve is configured to inject the fuel toward the cavity and is disposed at or near a radial center of the combustion chamber. The fuel injection control method includes: a first injection step in which the fuel injection valve injects the fuel at timing when the piston is positioned near a compression top dead center; a second injection step in which the fuel injection valve injects the fuel at timing earlier than the first injection; and a third injection step in which the fuel injection valve injects the fuel at timing earlier than the second injection or timing later than the first injection. The third injection step includes: a step of estimating a rotational diameter of a rotational flow generated in the first cavity portion based on injection pressure, injection amount, and injection timing of the first injection or the second injection; the rotational flow being an in-cylinder flow of an air-fuel mixture containing the injected fuel, a step of estimating an oxygen residual feasible region generated in the radial central region of the combustion chamber based on the estimated rotational diameter, and a step in which the fuel injection valve sprays the fuel only into the estimated oxygen residual feasible region. In the third injection step, the third injection is executed at timing later than the first injection when a total amount of the fuel injected by the third injection per one combustion cycle is equal to or greater than a predetermined reference amount; and the third injection is executed at timing earlier than the second injection when the total amount of the fuel injected by the third injection per one combustion cycle is less than the reference amount.

The fuel injection control system and method execute the third injection so as to spray the fuel only into the oxygen residual feasible region generated in the radial central region of the combustion chamber. Therefore, the air-fuel mixture can be formed with the air remaining in the radial central region of the combustion chamber and the fuel sprayed by the third injection. As a result, it is possible to effectively use the air in the combustion chamber to form the homogeneous, thin air-fuel mixture, and to implement high-quality diesel combustion in which generation of soot and the like is inhibited.

In the above-described fuel injection control system, the second injection control module preferably executes the third injection with an outer edge of the estimated oxygen residual feasible region as a penetration target. Also, in the fuel injection control method, the fuel injection valve preferably sprays the fuel with the outer edge of the estimated oxygen residual feasible region as the penetration target in the third injection step. The device and method can implement combustion effectively using the residual oxygen in the combustion chamber.

The present invention described above can provide a fuel injection control system and a fuel injection control method for a diesel engine that can form a homogeneous, thin air-fuel mixture by effectively using air in a combustion chamber to inhibit generation of soot and the like as much as possible.

This application is based on Japanese Patent application No. 2018-122990 filed in Japan Patent Office on Jun. 28, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A fuel injection control system for a diesel engine, the fuel injection control system comprising:
   a combustion chamber of an engine, formed with a lower surface of a cylinder head, a cylinder, and a crown surface of a piston;
   a fuel injection valve configured to inject fuel into the combustion chamber; and
   a fuel injection control device including a processor and configured to control an operation of the fuel injection valve; wherein
   the crown surface of the piston includes a cavity,
   the cavity includes:
     a first cavity portion disposed in a radial central region of the crown surface, the first cavity portion including a first bottom having a first depth in a cylinder axial direction;
     a second cavity portion disposed on an outer peripheral side of the first cavity portion in the crown surface, the second cavity portion including a second bottom having a depth shallower than the first depth in the cylinder axial direction; and
     a joint portion connecting the first cavity portion and the second cavity portion,
   the fuel injection valve is configured to inject the fuel toward the cavity and is disposed at or near a radial center of the combustion chamber,
   the fuel injection control device is configured to cause the fuel injection valve to execute at least: a main injection to inject the fuel at timing when the piston is positioned near a compression top dead center; a pilot injection to inject the fuel at timing earlier than the main injection; and a low penetration injection to inject the fuel at timing earlier than the pilot injection or timing later than the main injection,
   the fuel injection control device is configured to execute:
     a first injection control module to execute at least one of the main injection or the pilot injection at timing of injecting the fuel toward the joint portion; and
     a second injection control module to execute the low penetration injection to inject the fuel only into the radial central region of the combustion chamber,
   the second injection control module executes the low penetration injection at timing later than the main injection when a total amount of the fuel injected by the low penetration injection per one combustion cycle is equal to or greater than a predetermined reference amount, and the second injection control module executes the low penetration injection at timing earlier than the pilot injection when the total amount of the fuel injected by the low penetration injection per one combustion cycle is less than the reference amount.

2. The fuel injection control system according to claim 1, wherein
   the fuel injection valve is configured to execute a single low penetration injection or low penetration injections split into multiple times,
   the second injection control module executes the single low penetration injection during one combustion cycle when the total amount of the fuel injected by the low penetration injection per one combustion cycle is less than a predetermined second reference amount, and the second injection control module executes the low penetration injections split into multiple times during one combustion cycle when the total amount is equal to or greater than the second reference amount.

3. The fuel injection control system according to claim 1, wherein
   the fuel injection valve is configured to execute the low penetration singly or split the low penetration injection into a plurality of single low penetration injections,
   the second injection control module sets an injection amount of each of the single low penetration injections to be smaller when injection pressure of the fuel injection valve is high than when the injection pressure of the fuel injection valve is low, when the set injection amount of the single low penetration injection is equal to or greater than a predetermined reference single injection amount, the second injection control module executes the low penetration injection singly during one combustion cycle, when the injection amount of the single low penetration injection is less than the reference single injection amount, the second injection control module executes the low penetration injections split into multiple times during one combustion cycle.

4. The fuel injection control system according to claim 1, wherein
   the second injection control module executes the low penetration injection to cause an outer edge of the radial central region of the combustion chamber to be spray penetration.

5. The fuel injection control system according to claim 1, wherein
   the second injection control module estimates an oxygen residual feasible region that is generated in the radial central region of the combustion chamber based on injection pressure, injection amount, and injection timing of the main injection or the pilot injection by the first injection control module, and the second injection control module executes the low penetration injection to cause an outer edge of the oxygen residual feasible region to be spray penetration.

6. A fuel injection control system for a diesel engine, the fuel injection control system comprising:
   a combustion chamber of an engine, formed with a lower surface of a cylinder head, a cylinder, and a crown surface of a piston;
   a fuel injection valve configured to inject fuel into the combustion chamber; and
   a fuel injection control device including a processor and configured to control an operation of the fuel injection valve; wherein
   the crown surface of the piston includes a cavity,
   the cavity includes:
      a first cavity portion disposed in a radial central region of the crown surface, the first cavity portion including a first bottom having a first depth in a cylinder axial direction;
      a second cavity portion disposed on an outer peripheral side of the first cavity portion in the crown surface, the second cavity portion including a second bottom having a depth shallower than the first depth in the cylinder axial direction; and
      a joint portion connecting the first cavity portion and the second cavity portion,
   the fuel injection valve is configured to inject the fuel toward the cavity and is disposed at or near a radial center of the combustion chamber,
   the fuel injection control device is configured to cause the fuel injection valve to execute at least: a first injection to inject the fuel at timing when the piston is positioned near a compression top dead center; a second injection to inject the fuel at timing earlier than the first injection; and a third injection to inject the fuel at timing earlier than the second injection or timing later than the first injection,
   the fuel injection control device is configured to execute:
      a first injection control module to execute at least one of the first injection or the second injection at timing of injecting the fuel toward the joint portion; and
      a second injection control module to execute the third injection,
   the second injection control module:
      estimates a rotational diameter of a rotational flow generated in the first cavity portion based on injection pressure, injection amount, and injection timing of the first injection or the second injection by the first injection control module; the rotational flow being an in-cylinder flow of an air-fuel mixture containing the injected fuel,
      estimates an oxygen residual feasible region generated in the radial central region of the combustion chamber based on the estimated rotational diameter;
      executes the third injection to spray the fuel only into the estimated oxygen residual feasible region; and
      executes the third injection at timing later than the first injection when a total amount of the fuel injected by the third injection per one combustion cycle is equal to or greater than a predetermined reference amount, and executes the third injection at timing earlier than the second injection when the total amount of the fuel injected by the third injection per one combustion cycle is less than the reference amount.

7. The fuel injection control system according to claim 6, wherein
   the second injection control module executes the third injection with an outer edge of the estimated oxygen residual feasible region as a penetration target.

8. A fuel injection control method for a diesel engine, the diesel engine including: a combustion chamber formed with a lower surface of a cylinder head, a cylinder, and a crown surface of a piston; and a fuel injection valve configured to inject fuel into the combustion chamber, wherein
   the crown surface of the piston of the diesel engine includes a cavity, the cavity including: a first cavity portion disposed in a radial central region of the crown surface, the first cavity portion including a first bottom having a first depth in a cylinder axial direction; a second cavity portion disposed on an outer peripheral side of the first cavity portion in the crown surface, the second cavity portion including a second bottom having a depth shallower than the first depth in the cylinder axial direction; and a joint portion connecting the first cavity portion and the second cavity portion, the fuel injection valve is configured to inject the fuel toward the cavity and is disposed at or near a radial center of the combustion chamber,
   the fuel injection control method comprising:
      a first injection step in which the fuel injection valve injects the fuel at timing when the piston is positioned near a compression top dead center;
      a second injection step in which the fuel injection valve injects the fuel at timing earlier than the first injection; and
      a third injection step in which the fuel injection valve injects the fuel at timing earlier than the second injection or timing later than the first injection,
   the third injection step includes:
      a step of estimating a rotational diameter of a rotational flow generated in the first cavity portion based on injection pressure, injection amount, and injection timing of the first injection or the second injection; the rotational flow being an in-cylinder flow of an air-fuel mixture containing the injected fuel,
      a step of estimating an oxygen residual feasible region generated in the radial central region of the combustion chamber based on the estimated rotational diameter, and
      a step in which the fuel injection valve sprays the fuel only into the estimated oxygen residual feasible region; wherein
   in the third injection step, the third injection is executed at timing later than the first injection when a total amount of the fuel injected by the third injection per one combustion cycle is equal to or greater than a predetermined reference amount; and the third injection is executed at timing earlier than the second injection when the total amount of the fuel injected by the third injection per one combustion cycle is less than the reference amount.

9. The fuel injection control method according to claim 8, wherein
   in the third injection step, the fuel injection valve sprays the fuel with an outer edge of the estimated oxygen residual feasible region as a penetration target.

* * * * *